United States Patent
Bai et al.

(10) Patent No.: US 12,261,672 B2
(45) Date of Patent: *Mar. 25, 2025

(54) BEAM FAILURE RECOVERY REQUEST FOR PER BEAM GROUP BEAM FAILURE RECOVERY

(71) Applicant: QUALCOMM Incorporated, San Diego, CA (US)

(72) Inventors: Tianyang Bai, Mountain View, CA (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/540,259

(22) Filed: Dec. 14, 2023

(65) Prior Publication Data

US 2024/0113767 A1    Apr. 4, 2024

Related U.S. Application Data

(63) Continuation of application No. 17/205,824, filed on Mar. 18, 2021, now Pat. No. 11,888,574.

(51) Int. Cl.
| | | |
|---|---|---|
| *H04B 7/08* | (2006.01) | |
| *H04W 72/21* | (2023.01) | |
| *H04W 74/00* | (2009.01) | |
| *H04W 74/0833* | (2024.01) | |
| *H04W 76/19* | (2018.01) | |

(52) U.S. Cl.
CPC ............ *H04B 7/088* (2013.01); *H04W 72/21* (2023.01); *H04W 74/004* (2013.01); *H04W 74/0833* (2013.01); *H04W 76/19* (2018.02)

(58) Field of Classification Search
CPC .... H04B 7/088; H04W 72/21; H04W 74/004; H04W 74/0833; H04W 76/19
See application file for complete search history.

(56) References Cited

U.S. PATENT DOCUMENTS

| | | | |
|---|---|---|---|
| 2020/0350972 A1* | 11/2020 | Yi | ............................ H04L 1/12 |
| 2021/0028849 A1 | 1/2021 | Chin et al. | |
| 2021/0058130 A1 | 2/2021 | Zhu et al. | |
| 2022/0103419 A1 | 3/2022 | Zhou et al. | |
| 2022/0271887 A1 | 8/2022 | Zhang et al. | |
| 2022/0294520 A1 | 9/2022 | Tran et al. | |
| 2022/0302988 A1 | 9/2022 | Bai et al. | |

OTHER PUBLICATIONS

International Search Report and Written Opinion—PCT/US2022/070647—ISA/EPO—Jun. 8, 2022.

* cited by examiner

*Primary Examiner* — Basil Ma
(74) *Attorney, Agent, or Firm* — Harrity & Harrity, LLP \ Qualcomm

(57) ABSTRACT

Various aspects of the present disclosure generally relate to wireless communication. In some aspects, a user equipment (UE) may detect beam failure for a first beam group in a cell including the first beam group and a second beam group. The UE may selectively transmit a beam failure recovery request for the first beam group based at least in part on a determination of uplink resource availability in the second beam group. Numerous other aspects are described.

20 Claims, 12 Drawing Sheets

BEAM FAILURE RECOVERY REQUEST FOR PER BEAM GROUP BEAM FAILURE RECOVERY

RELATED APPLICATION

This application is a continuation of U.S. patent application Ser. No. 17/205,824, filed Mar. 18, 2021, which is incorporated herein by reference in its entirety.

FIELD OF THE DISCLOSURE

Aspects of the present disclosure generally relate to wireless communication and to techniques and apparatuses for beam failure recovery (BFR) requests for per beam group BFR.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BS s) that can support communication for a number of user equipment (UEs). A UE may communicate with a BS via the downlink and uplink "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes memory; one or more processors coupled to the memory; and instructions stored in the memory and operable, when executed by the one or more processors, to cause the UE to: detect beam failure for a first beam group in a cell including the first beam group and a second beam group; and selectively transmit a beam failure recovery request for the first beam group based at least in part on a determination of uplink resource availability in the second beam group.

In some aspects, a method of wireless communication performed by a UE includes detecting beam failure for a first beam group in a cell including the first beam group and a second beam group; and selectively transmitting a beam failure recovery request for the first beam group based at least in part on a determination of uplink resource availability in the second beam group.

In some aspects, a non-transitory computer-readable medium stores one or more instructions for wireless communication that, when executed by one or more processors of a UE, cause the UE to: detect beam failure for a first beam group in a cell including the first beam group and a second beam group; and selectively transmit a beam failure recovery request for the first beam group based at least in part on a determination of uplink resource availability in the second beam group.

In some aspects, an apparatus for wireless communication includes means for detecting beam failure for a first beam group in a cell including the first beam group and a second beam group; and means for selectively transmitting a beam failure recovery request for the first beam group based at least in part on a determination of uplink resource availability in the second beam group.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
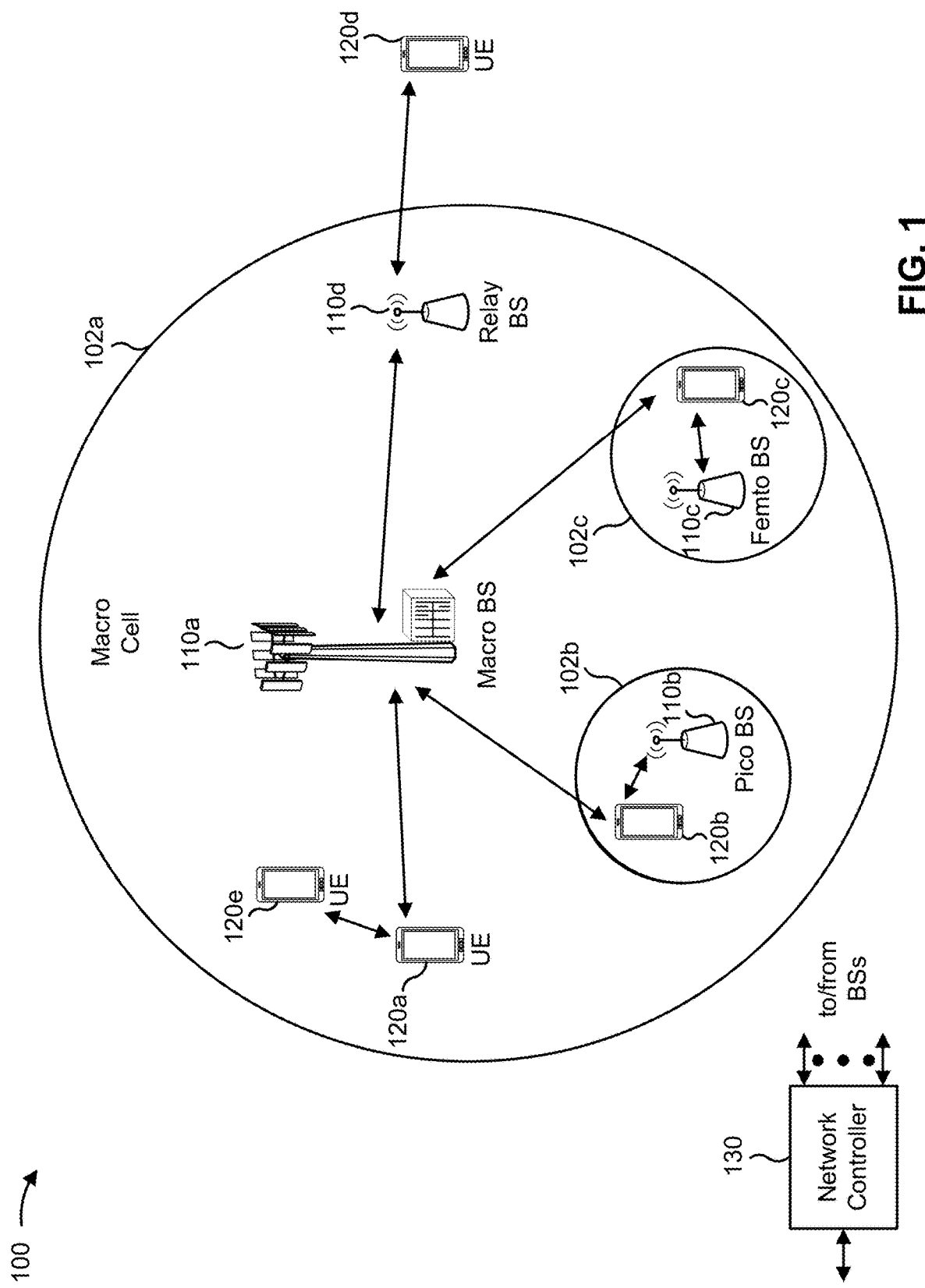
FIG. 1 is a diagram illustrating an example of a wireless network, in accordance with the present disclosure.

A cell associated with a base station may serve a user equipment (UE) using different groups of beams. For example, a cell may include multiple transmit and receive points (TRPs) that are associated with different beam groups. A UE may be configured to perform per beam group (e.g., per TRP) beam failure detection (BFD). In this case, the UE may detect a beam failure for beam group in a cell without detecting beam failure for another beam group in the cell. Because detecting beam failure for one beam group may not mean that all beams in the cell fail, the UE may be able to transmit a per beam group (e.g., per TRP) beam failure recovery (BFR) request via a beam in another beam group in the cell. However, in some cases, the UE may not be able to select an uplink resource for transmitting a per beam group BFR request. For example, there may be no configured dedicated uplink resources for transmitting a per beam group BFR request, or a configured dedicated uplink resource for transmitting a per beam group BFR request may be associated with the beam group for which beam failure is detected. In such cases, the UE may not be able to quickly request per beam group BFR. For example, the UE may need to wait until beam failure is detected for the whole cell to request BFR at a cell level, resulting in increased delay in beam failure recovery, increased latency of uplink and/or downlink traffic, and decreased network speed.

Some techniques and apparatuses described herein enable a UE to detect beam failure for a first beam group in a cell including a first beam group and a second beam group. The UE may selectively transmit a BFR request for the first beam group based at least in part on a determination of uplink resource availability in the second beam group. In some aspects, the first beam group may be associated with a first TRP and the second beam group may be associated with a second TRP. In some aspects, based at least in part on the determination of the uplink resource availability in the second beam group, the UE may transmit a BFR scheduling request on a beam of the second beam group using a PUCCH scheduling request resource dedicated to BFR for the first beam group, the UE may transmit a BFR scheduling request using an earliest available PUCCH scheduling request resource on a beam of the second beam group, or the UE may transmit a BFR MAC-CE using an existing scheduled PUSCH resource on a beam of the second beam group. As a result, the UE may select an available uplink resource in a case in which there are no dedicated resources configured in the second beam group. This may reduce cases in which the UE cannot transmit per beam group or per TRP BFR requests, thus reducing delays in beam failure recover, decreasing latency of uplink and/or downlink traffic, and increasing network speed. Furthermore, the UE may select the uplink resource based at least in part on a determination of an earliest available network resource, which may decrease latency associated with requesting BFR.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with UEs and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
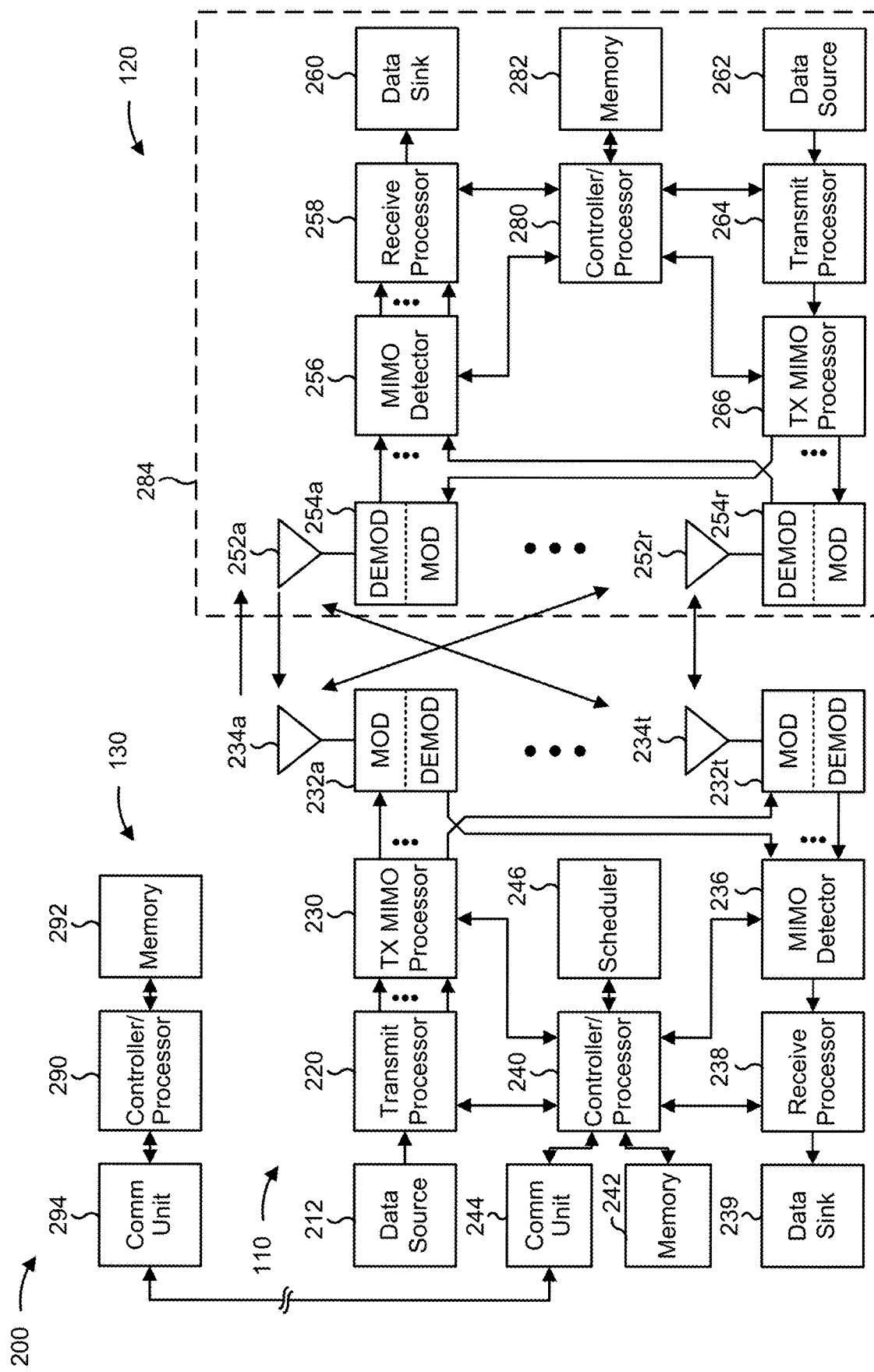
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 7-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7-11.

Controller/processor 240 of base station 110, controller/processor 280 of UE 120, and/or any other component(s) of FIG. 2 may perform one or more techniques associated with beam failure recovery (BFR) requests for per beam group BFR, as described in more detail elsewhere herein. In some aspects, the TRP described herein is the base station 110, is included in the base station 110, or includes one or more components of the base station 110 shown in FIG. 2. For example, controller/processor 240 of base station 110, controller/processor 280 of UE 120, and/or any other component(s) of FIG. 2 may perform or direct operations of, for example, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, and/or other processes as described herein. In some aspects, executing instructions may include running the instructions, converting the instructions, compiling the instructions, and/or interpreting the instructions, among other examples.

In some aspects, the UE 120 includes means for detecting beam failure for a first beam group in a cell including the first beam group and a second beam group; and/or means for selectively transmitting a beam failure recovery request for the first beam group based at least in part on a determination of uplink resource availability in the second beam group. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
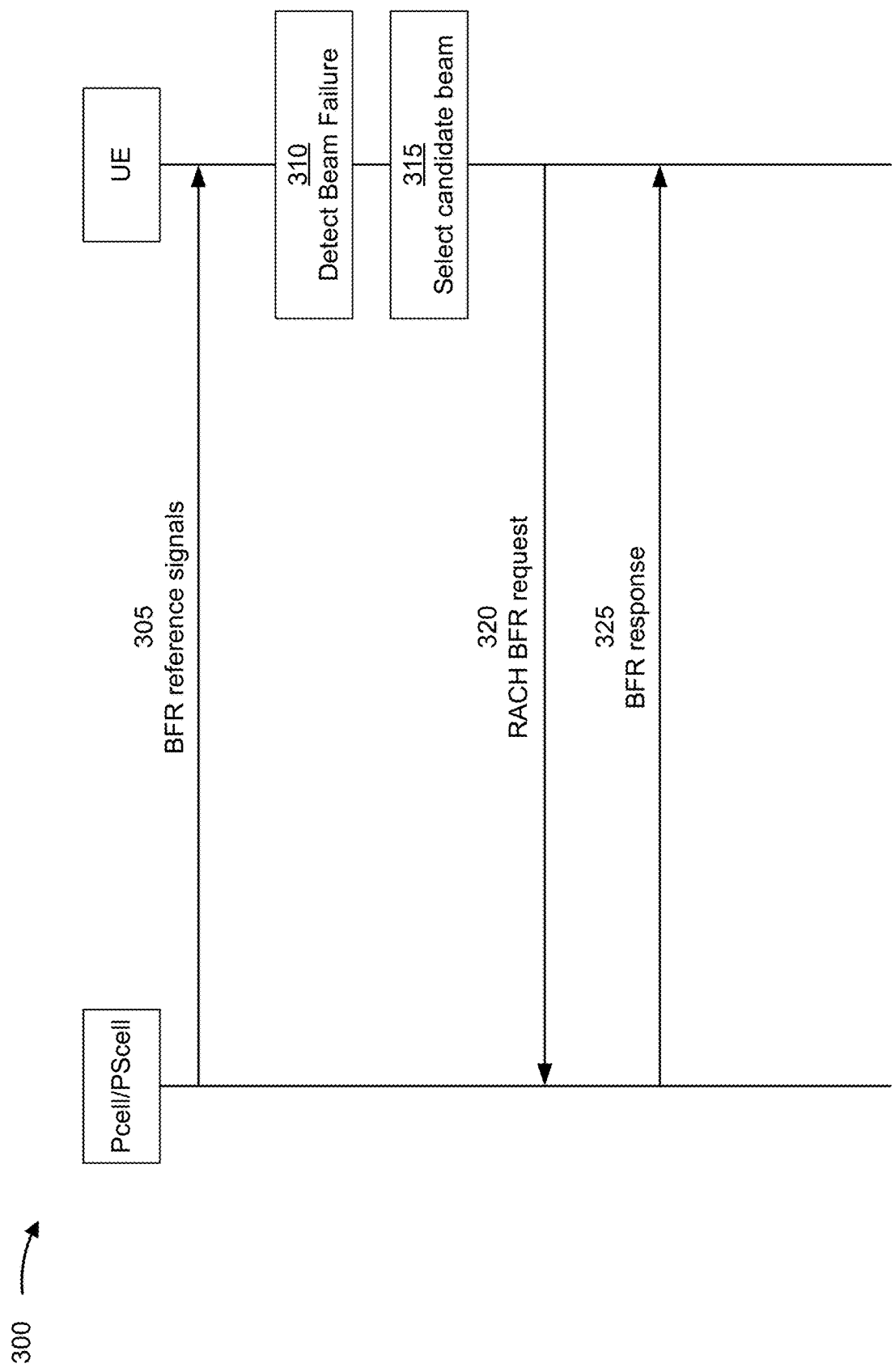
FIG. 3 is a diagram illustrating an example of beam failure detection (BFD) and beam failure recovery (BFR), in accordance with the present disclosure.

FIG. 3 is a diagram illustrating an example 300 of beam failure detection (BFD) and BFR, in accordance with the present disclosure. Example 300 shows BFR for a primary carrier component, or primary cell (Pcell), configured for a UE. Carrier aggregation is a technology that enables two or more component carriers (sometimes referred to as carriers) to be combined (e.g., into a single channel) for a UE to enhance data capacity. In carrier aggregation, a UE may be configured with a primary carrier or Pcell and one or more secondary carriers or secondary cells (Scells). In some aspects, the Pcell may carry control information for scheduling data communications on the one or more Scells. The BFR shown in FIG. 3 may be used for the Pcell in a case in which carrier aggregation is configured for the UE. The BFR shown in FIG. 3 may also be used for a PScell (e.g., a Pcell of a secondary cell group) in a case in which dual connectivity and carrier aggregation are configured for the UE.

As shown in FIG. 3, and by reference number 305, a UE may receive (e.g., on the Pcell or PScell) BFD reference signals transmitted by a base station. The UE may perform BFD based at least in part on measurements performed on the BFD reference signals. The BFD reference signals may include channel state information reference signals (CSI-RS s) transmitted using periodic CSI-RS resources configured via a parameter in a radio resource control (RRC) message. In some examples, a BFD reference signal set may be configured with up to two reference signals associated with a single antenna port. In a case in which the BFD reference signal set is not configured by the base station, reference signal sets indicated by active transmission configuration indicator (TCI) states of control resource sets (CORESETs) monitored by the UE may be used for BFD. In some examples, in a case in which, for an active CORESET, there are two reference signal indices, the reference signal having a quasi co-location (QCL) parameter of type D may be used for BFD.

As shown by reference number 310, the UE may detect a beam failure based at least in part on the BFD reference signals. The physical layer in the UE may assess radio link quality by measuring RSRP of the BFD reference signals and comparing the RSRP measurements with a threshold (Qout). If the RSRP measurements are less than Qout, the physical layer may provide a beam failure indication (e.g., out of service indication) to a higher layer of the UE (e.g., the medium access control (MAC) layer), which may increment a beam failure indicator counter. The UE may detect beam failure based at least in part on a threshold number of beam failure indications within a certain time duration (e.g., a BFD timer).

As shown by reference number 315, based at least in part on detecting a beam failure, the UE may perform candidate beam detection to select a candidate beam for BFR. The UE may perform candidate beam detection based at least in part on periodic CSI-RSs and/or synchronization signal blocks (SSBs) configured for a number of beam candidates. In some examples, CSI-RS/SSB resources may be configured for up to 16 beam candidates with corresponding random access preamble indices. Upon a request from a higher layer (e.g., the MAC layer), the physical layer of the UE may detect a reference signal with an RSRP that satisfies a threshold (Qin) and provide the reference signal index to the higher layers.

As shown by reference number 320, the UE may then transmit a random access channel (RACH) BFR request to the base station. For example, the UE may initiate a contention free RACH procedure based on the random access resource (e.g., the random access preamble index) associated with the selected reference signal index corresponding to the selected candidate beam.

As shown by reference number 325, the UE may receive a BFR response based at least in part on transmitting the RACH BFR request. The UE may monitor a physical downlink control channel (PDCCH) search space set to detect a PDCCH communication with downlink control information (DCI) format with a cyclic redundancy check (CRC) scrambled by a cell radio network temporary identifier (C-RNTI) or an MCS cell radio network temporary identifier (MCS-C-RNTI), starting a certain number of slots after transmitting the RACH request (e.g., starting from slot n+4). In this case, the UE monitors for a random access response (e.g., the PDCCH communication), which is the BFR response. The search space for the PDCCH monitoring may be identified by a recovery search space ID, and, in some examples, the CORESET associated with a secondary synchronization signal (SSS) provided by the recovery search space ID may not be used for any other SSS. For PDCCH monitoring in the SSS provided by the recovery search space ID and for corresponding physical downlink shared channel (PDSCH) reception, the UE may us the same QCL parameters as those associated with the reference signal index selected during candidate beam selection (e.g., the QCL parameters associated with the selected candidate beam) until the UE receives an activation for a TCI state associated with another beam.

In a case in which the UE receives the PDCCH communication with CRC scrambled by C-RNTI or MCS-C-RNTI within a time window associated with the contention free RACH procedure, the BFR may be complete for the UE. In this case, after a certain number of symbols (e.g., 28 symbols) from a last symbols of the first PDCCH reception, in the search space being monitored by the UE, for which the UE detects a DCI format scrambled by C-RNTI or MCS-C-RNTI, the UE may use the same QCL parameters as those associated with the selected reference signal index for PDCCH monitoring in a CORESET with index 0.

In a case in which the UE does not receive the PDCCH communication with CRC scrambled by C-RNTI or MCS-C-RNTI with the time window associated with the conten- tion free RACH procedure, the UE may initiate a contention-based RACH procedure to transmit the BFR request to the base station. The UE may then monitor the search space for a PDCCH communication with CRC scrambled by C-RNTI or MCS-C-RNTI in response to the contention-based RACH request. In a case, in which the UE does not receive the BFR response in a time window associated with the contention-based RACH procedure, or in a case in which a BFR timer, which starts upon detection of beam failure, expires prior to receiving a BFR response, the UE may declare a radio link failure.

As indicated above, FIG. 3 is provided as an example. Other examples may differ from what is described with respect to FIG. 3.

Figure 4:
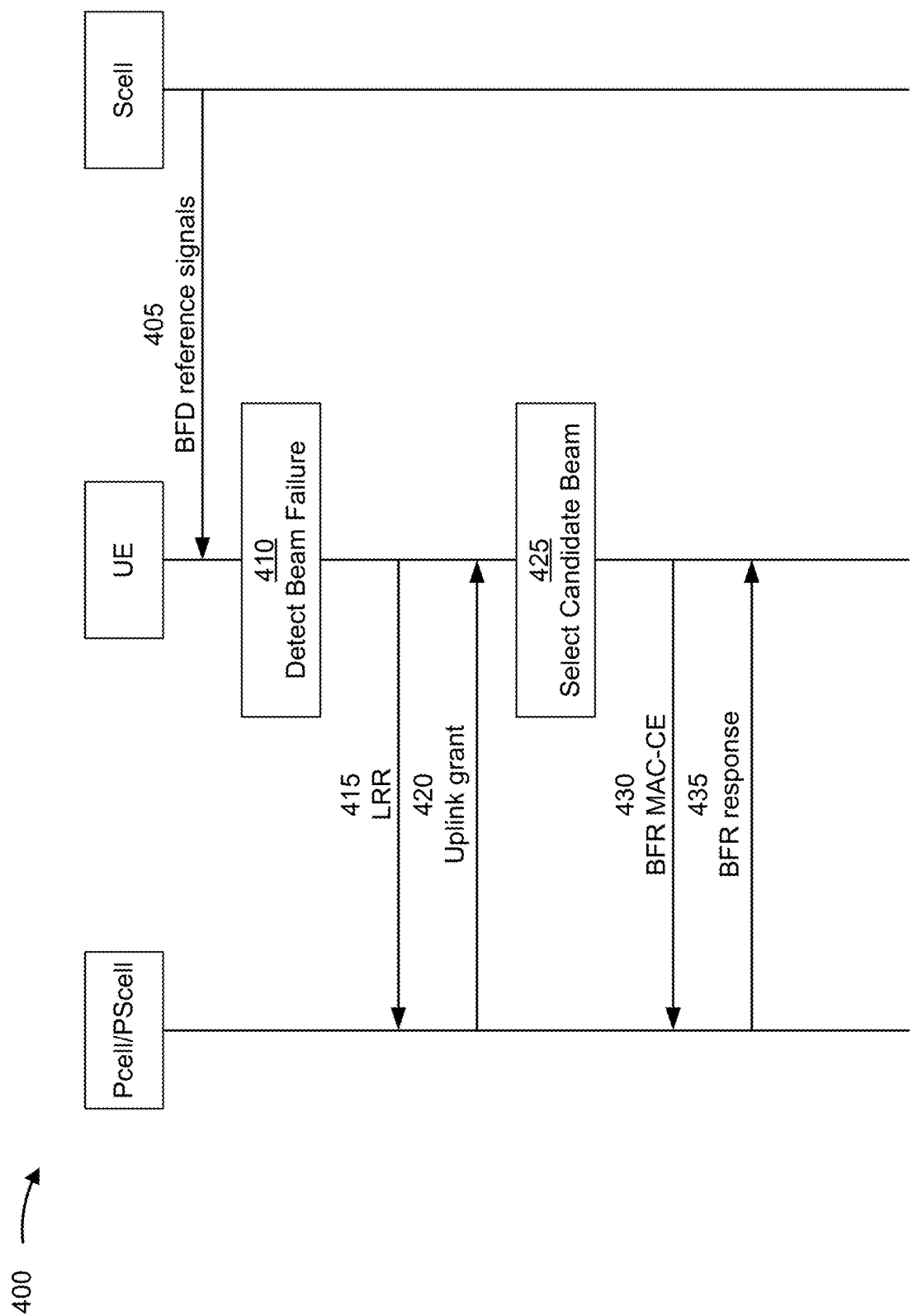
FIG. 4 is a diagram illustrating an example of BFR for a secondary cell (Scell), in accordance with the present disclosure.

FIG. 4 is a diagram illustrating an example 400 of BFR for an Scell, in accordance with the present disclosure. As described above, an Scell is a secondary component carrier configured for a UE in carrier aggregation.

As shown in FIG. 4, and by reference number 405, the UE may receive BFD reference signals on the Scell. The UE may perform BFD based at least in part on measurements (e.g., RSRP measurements) performed on the BFD reference signals. As shown by reference number 410, the UE may detect beam failure on the Scell based at least in part on the measurements performed on the BFD reference signals.

As shown by reference number 415, the UE may transmit, to a base station on the Pcell or PScell, a link recovery request (LRR). In some examples, the UE may transmit the LRR on an Scell configured with a physical uplink control channel (PUCCH) (PUCCH-Scell), in which PUCCH BFR is configured. This LRR may be a scheduling request for requesting an uplink grant to schedule an uplink transmission of a BFR MAC control element (MAC-CE). For example, the LRR may be a PUCCH communication that uses PUCCH format 0 or PUCCH format 1.

As shown by reference number 420, the base station may transmit, to the UE on the Pcell, PScell, or PUCCH-Scell, an uplink grant based at least in part on the LRR. For example, the uplink grant may be included in DCI with CRC scrambled with C-RNTI or MCS-C-RNTI. The uplink grant may schedule a physical uplink shared channel (PUSCH) resource in which the UE may transmit the BFR MAC-CE.

As shown by reference number 425, the UE may perform candidate beam detection to select a candidate beam for BFR. The UE may be configured to receive a reference signal (or reference signal set) on each beam of a list of candidate beams. In some examples, the UE may be configured with up to 64 reference signal resources (corresponding to 64 beams). The UE may receive the reference signals on different beams on the failed Scell or another component carrier in a same frequency band as the failed Scell. In this case, the UE is not performing a RACH procedure, so the reference signal resources configured for the candidate beams may not be associated with RACH resources. The UE may select a candidate beam for which the RSRP of corresponding reference signals satisfies a threshold (Qin).

As shown by reference number 430, the UE may transmit, to the base station, the BFR MAC-CE. For example, the UE may transmit the BFR MAC-CE using the PUSCH resource scheduled by the uplink grant. Alternatively, in some examples, if the UE has an already scheduled uplink grant, the UE may transmit the BFR MAC-CE in the already scheduled uplink grant without transmitting the LRR or receiving the uplink grant. The BFR MAC-CE may include an indication of the failed Scell (e.g., an index of the Scell) and an indication of the selected candidate beam for the Scell. Because the BFR MAC-CE may be transmitted in a scheduled PUSCH resource, the BFR MAC-CE may be transmitted on any component carrier, including the Scell.

As shown by reference number 435, the UE may receive, from the base station, a BFR response. In this case, the BFR response may be a response to the BFR MAC-CE. The response to the BFR MAC-CE may be an uplink grant to schedule a new transmission (e.g., with a toggled new data indicator (NDI)) for a same hybrid automatic repeat request (HARD) process as the PUSCH transmission carrying the BFR MAC-CE. In a case in which a new beam (e.g., the selected beam candidate) is reported in the BFR MAC-CE after a certain number of symbols (e.g., 28 symbols) from the end of the BFR response (e.g., the end of the PDCCH communication), all CORESET beams on the failed Scell may be reset to the new beam. In a case in which the failed Scell is a PUCCH-Scell, spatial relationship information for the PUCCH may be configured for the new beam after the certain number of symbols (e.g., 28 symbols) from the end of the BFR response. In a case in which the LRR is not transmitted on the failed Scell, PUCCH beams on the failed Scell may be reset to the new beam after the certain number of symbols (e.g., 28 symbols) from the end of the BFR response.

As indicated above, FIG. 4 is provided as an example. Other examples may differ from what is described with respect to FIG. 4.

Figure 5:
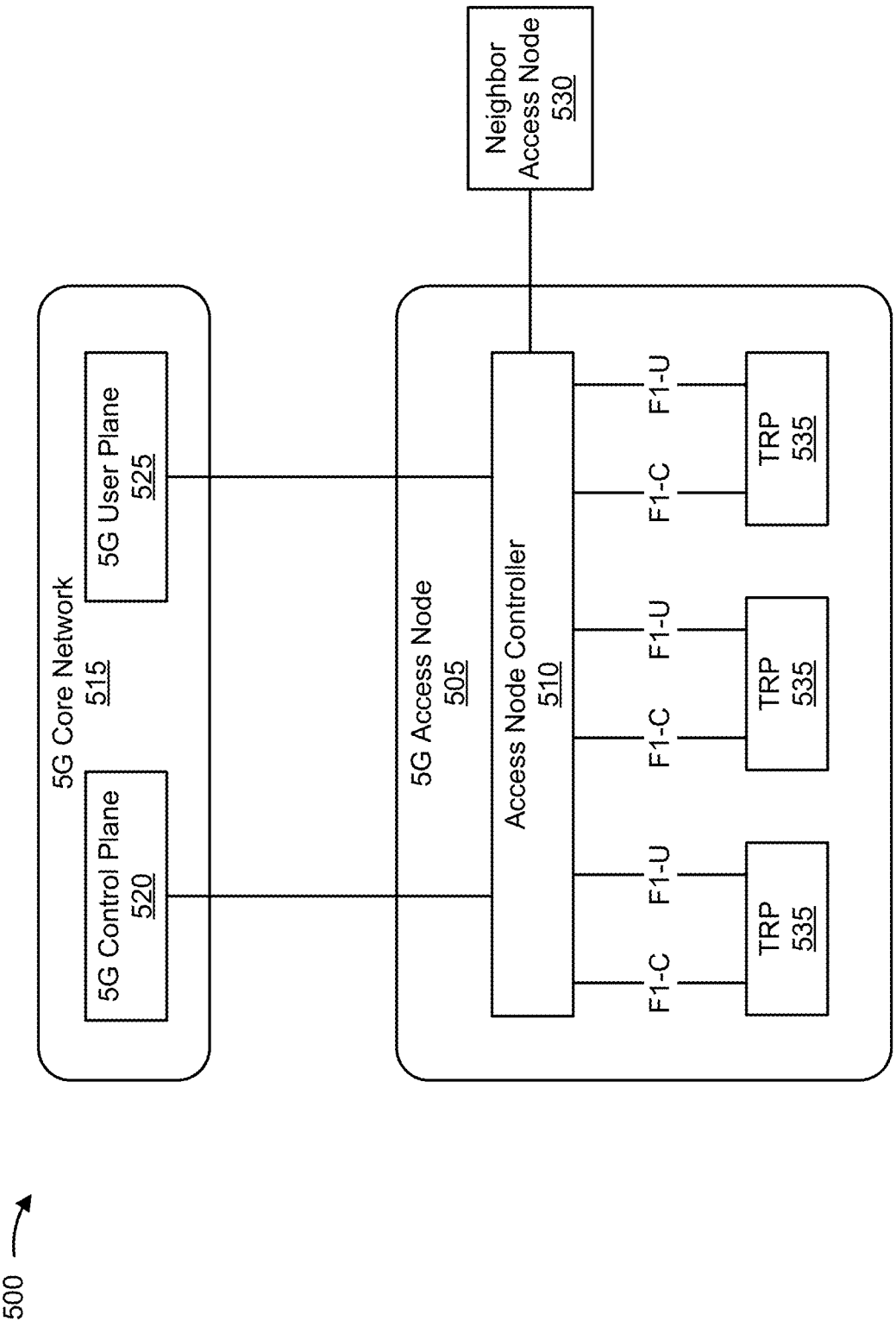
FIG. 5 is a diagram illustrating an example of a logical architecture of a distributed radio access network (RAN), in accordance with the present disclosure.

FIG. 5 is a diagram illustrating an example 500 of a logical architecture of a distributed radio access network (RAN), in accordance with the present disclosure.

A 5G access node 505 may include an access node controller 510. The access node controller 510 may be a central unit (CU) of the distributed RAN. In some aspects, a backhaul interface to a 5G core network 515 may terminate at the access node controller 510. The 5G core network 515 may include a 5G control plane component 520 and a 5G user plane component 525 (e.g., a 5G gateway), and the backhaul interface for one or both of the 5G control plane and the 5G user plane may terminate at the access node controller 510. Additionally, or alternatively, a backhaul interface to one or more neighbor access nodes 530 (e.g., another 5G access node 505 and/or an LTE access node) may terminate at the access node controller 510.

The access node controller 510 may include and/or may communicate with one or more TRPs 535 (e.g., via an F1 Control (F1-C) interface and/or an F1 User (F1-U) interface). A TRP 535 may be a distributed unit (DU) of the distributed RAN. In some aspects, a TRP 535 may correspond to a base station 110 described above in connection with FIG. 1. For example, different TRPs 535 may be included in different base stations 110. Additionally, or alternatively, multiple TRPs 535 may be included in a single base station 110. In some aspects, a base station 110 may include a CU (e.g., access node controller 510) and/or one or more DUs (e.g., one or more TRPs 535). In some cases, a TRP 535 may be referred to as a cell, a panel, an antenna array, or an array. In some aspects, a cell associated with a base station 110 may have multiple TRPs 535.

In some aspects, multiple TRPs 535 may transmit communications (e.g., the same communication or different communications) in the same transmission time interval (TTI) (e.g., a slot, a mini-slot, a subframe, or a symbol) or different TTIs using different QCL relationships (e.g., different spatial parameters, different transmission configuration indicator (TCI) states, different precoding parameters, and/or different beamforming parameters). In some aspects, a TCI state may be used to indicate one or more QCL relationships. In some aspects, different beam groups (e.g., corresponding to different TCI states and/or QCL relationships) may be configured for different TRPs 535 in a cell. A TRP 535 may be configured to individually (e.g., using dynamic selection) or jointly (e.g., using joint transmission with one or more other TRPs 535) serve traffic to a UE 120.

As indicated above, FIG. 5 is provided as an example. Other examples may differ from what was described with regard to FIG. 5.

Figure 6:
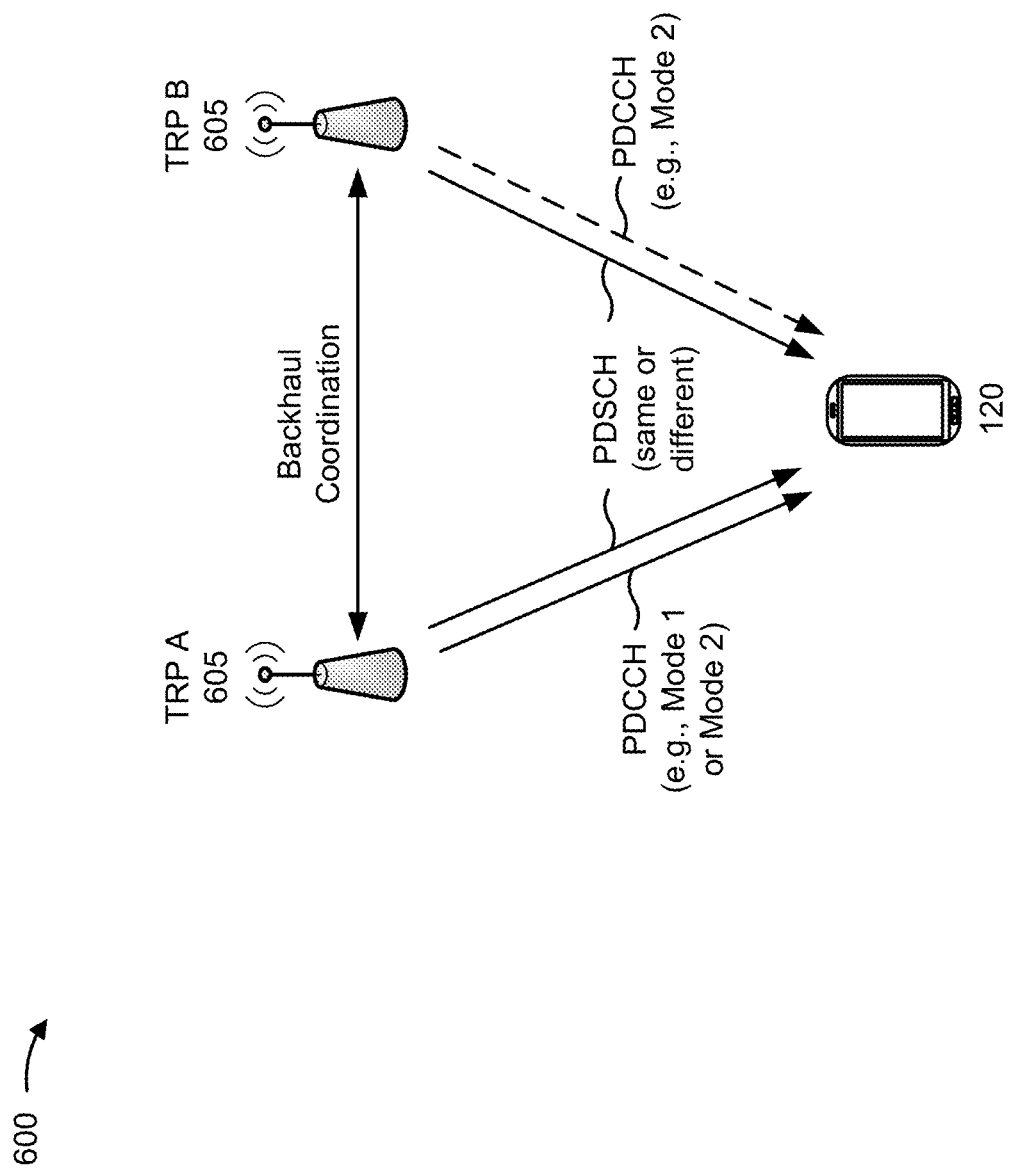
FIG. 6 is a diagram illustrating an example of multi-transmit receive point (TRP) communication, in accordance with the present disclosure.

FIG. 6 is a diagram illustrating an example 600 of multi-TRP communication (sometimes referred to as multi-panel communication), in accordance with the present disclosure. As shown in FIG. 6, multiple TRPs 605 may communicate with the same UE 120. A TRP 605 may correspond to a TRP 535 described above in connection with FIG. 5.

The multiple TRPs 605 (shown as TRP A and TRP B) may communicate with the same UE 120 in a coordinated manner (e.g., using coordinated multipoint transmissions) to improve reliability and/or increase throughput. The TRPs 605 may coordinate such communications via an interface between the TRPs 605 (e.g., a backhaul interface and/or an access node controller 510). The interface may have a smaller delay and/or higher capacity when the TRPs 605 are co-located at the same base station 110 (e.g., when the TRPs 605 are different antenna arrays or panels of the same base station 110), and may have a larger delay and/or lower capacity (as compared to co-location) when the TRPs 605 are located at different base stations 110. The different TRPs 605 may communicate with the UE 120 using different QCL relationships (e.g., different TCI states), different demodulation reference signal (DMRS) ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 605 (e.g., TRP A and TRP B) may transmit communications to the UE 120 on the same PDSCH. For example, a communication may be transmitted using a single codeword with different spatial layers for different TRPs 605 (e.g., where one codeword maps to a first set of layers transmitted by a first TRP 605 and maps to a second set of layers transmitted by a second TRP 605). As another example, a communication may be transmitted using multiple codewords, where different codewords are transmitted by different TRPs 605 (e.g., using different sets of layers). In either case, different TRPs 605 may use different QCL relationships (e.g., different TCI states) for different DMRS ports corresponding to different layers. For example, a first TRP 605 may use a first QCL relationship or a first TCI state for a first set of DMRS ports corresponding to a first set of layers, and a second TRP 605 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 605, and a second PDCCH may schedule a second codeword to be transmitted by a second TRP 605. Furthermore, first DCI (e.g., transmitted by the first TRP 605) may schedule a first PDSCH communication associated with a first set of DMRS ports with a first QCL relationship (e.g., indicated by a first TCI state) for the first TRP 605, and second DCI (e.g., transmitted by the second TRP 605) may schedule a second PDSCH communication associated with a second set of DMRS ports with a second QCL relationship (e.g., indicated by a second TCI state) for the second TRP 605. In this case, DCI (e.g., having DCI format 1_0 or DCI format 1_1) may indicate a corresponding TCI state for a TRP 605 corresponding to the DCI. The TCI field of a DCI indicates the corresponding TCI state (e.g., the TCI field of the first DCI indicates the first TCI state and the TCI field of the second DCI indicates the second TCI state).

The TRPs 605 may communicate with the UE 120 using different sets of beams. For example, the first TRP 605 (e.g., TRP A) may communicate with the UE 120 using one or more beams in a first beam group (e.g., corresponding to a first set of TCI states and/or QCL relationships), and second TRP 605 (e.g., TRP B) may communicate with the UE 120 using one or more beams in a second beam group (e.g., corresponding to a second set of TCI states and/or QCL relationships). In some aspects, the UE 120 may be configured with separate BFD reference signal sets for the multiple TRPs 605. In this case, the UE 120 may perform per TRP (or per beam group) BFD.

As indicated above, FIG. 6 is provided as an example. Other examples may differ from what is described with respect to FIG. 6.

A cell may serve a UE using different groups of beams. For example, as described above in connection with FIG. 6, each group of beams in a cell may correspond to a respective TRP of multiple TRPs in the cell. A UE may be configured with different BFD reference signal sets for different beam groups and/or TRPs in a cell. The UE may monitor the different BFD reference signals to perform per beam group and/or per TRP BFD. In this case, the UE may detect a beam failure for one TRP in a cell without detecting beam failure for another TRP in the cell. Because detecting beam failure for one TRP may not mean that all beams in the cell fail, the UE may be able to transmit a per TRP BFR request via another TRP. However, in some cases, the UE may not be able to select an uplink resource for transmitting a per TRP (or per beam group) BFR request. For example, there may be no configured dedicated uplink resources for transmitting a per TRP BFR request, or a configured dedicated uplink resource for transmitting a per TRP BFR request may be associated with the TRP for which beam failure is detected. In such cases, the UE may not be able to quickly request per TRP BFR. For example, the UE may need to wait until beam failure is detected for the whole cell to request beam failure, resulting in increased delay in beam failure recovery, increased latency of uplink and/or downlink traffic, and decreased network speed.

Some techniques and apparatuses described herein enable a UE to detect beam failure for a first beam group in a cell including a first beam group and a second beam group. The UE may selectively transmit a BFR request for the first beam group based at least in part on a determination of uplink resource availability in the second beam group. In some aspects, the first beam group may be associated with a first TRP and the second beam group may be associated with a second TRP. In some aspects, based at least in part on the determination of the uplink resource availability in the second beam group, the UE may transmit a BFR scheduling request on a beam of the second beam group using a PUCCH scheduling request resource dedicated to BFR for the first beam group, the UE may transmit a BFR scheduling request using an earliest available PUCCH scheduling request resource on a beam of the second beam group, or the UE may transmit a BFR MAC-CE using an existing scheduled PUSCH resource on a beam of the second beam group. As a result, the UE may select an available uplink resource in a case in which there are no dedicated resources configured in the second beam group. This may reduce cases in which the UE cannot transmit per beam group or per TRP BFR requests, thus reducing delays in beam failure recover, decreasing latency of uplink and/or downlink traffic, and increasing network speed. Furthermore, the UE may select the uplink resource based at least in part on a determination of an earliest available network resource, which may decrease latency associated with requesting BFR.

Figure 7:
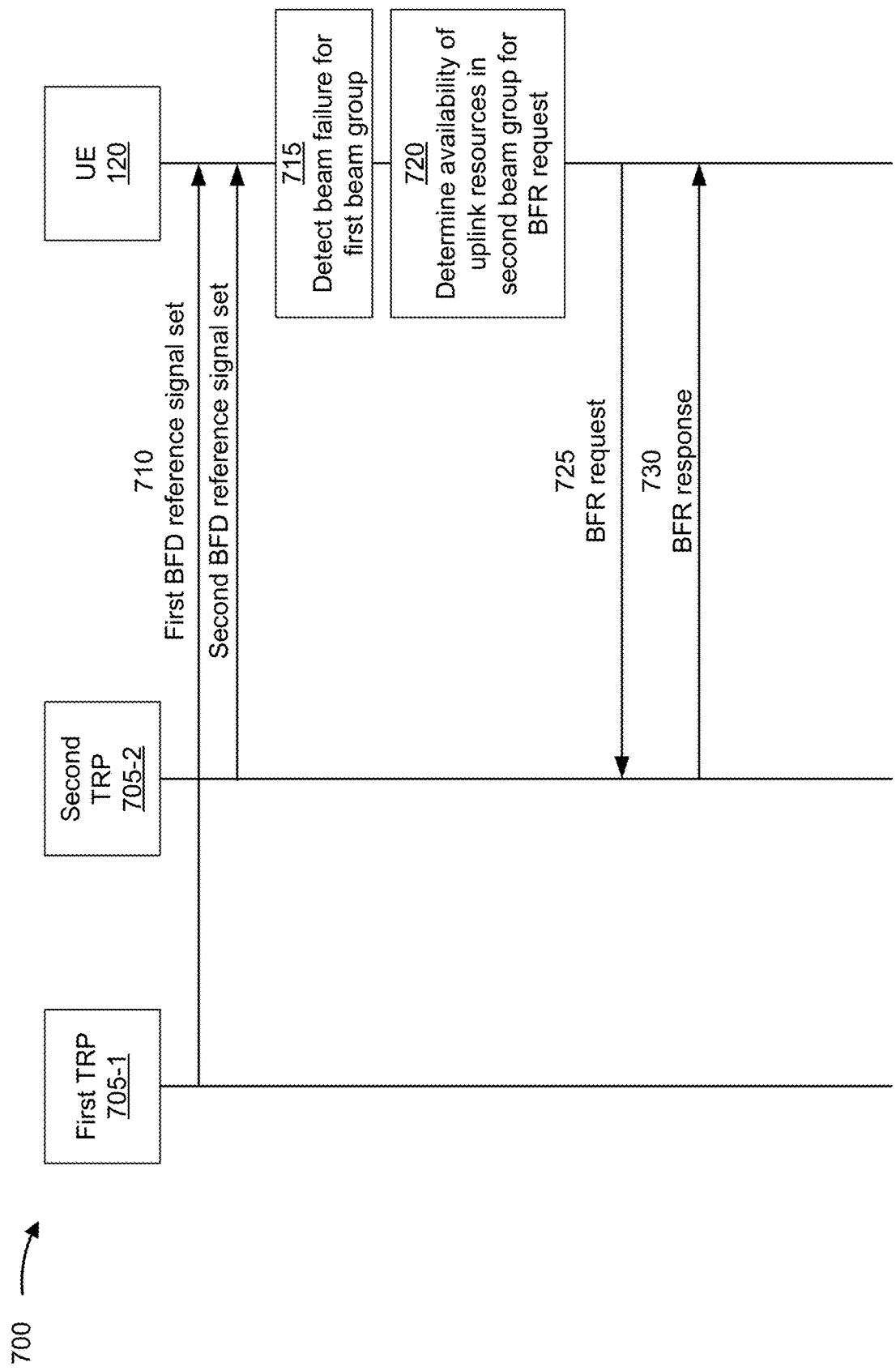
FIGS. 7-10 are diagrams illustrating examples associated with BFR requests for per beam group BFR, in accordance with the present disclosure.

FIG. 7 is a diagram illustrating an example 700 associated with BFR requests for per beam group BFR, in accordance with the present disclosure. As shown in FIG. 7, example 700 includes communication between a UE 120, a first TRP 705-1, and a second TRP 705-2. In some aspects, the first TRP 705-1, the second TRP 705-2, and UE 120 may be included in a wireless network, such as wireless network 100. The UE 120 may communicate with the first TRP 705-1 and the second TRP 705-2 via wireless access links, which may include uplinks and downlinks.

The first TRP 705-1 and the second TRP 705-2 (collectively, TRPs 705) may correspond to TRPs described elsewhere herein, such as TRPs 535 described above in connection with FIG. 5 and/or TRPs 605 described above in connection with FIG. 6. The TRPs 705 may communicate with each other and may coordinate communications with the UE 120 via an interface between the TRPs 705 (e.g., a backhaul interface and/or an access node controller). The TRPs 705 may be in the same cell. For example, the TRPs 705 may be DUs associated with the same 5G access node (e.g., gNB). In some aspects, the TRPs 705 may be co-located at the same base station 110. For example, the TRPs 705 may be different antenna arrays or panels of the same base station 110. In some aspects, the TRPs 705 may be located at different base station 110 in the same cell. The TRPs 705 may be associated with different beam groups in the cell. For example, a first beam group in the cell may be associated with the first TRP 705-1 and a second beam group in the cell may be associated with the second TRP 705-2.

As shown in FIG. 7, and by reference number 710, the UE 120 may receive, from the first TRP 705-1, a first BFD reference signal set associated with the first beam group, and the UE 120 may receive, from the second TRP 705-2, a second BFD reference signal set associated with the second beam group. Each BFD reference signal set (e.g., the first BFD reference signal set and the second BFD reference signal set) may include one or more reference signals (e.g., CSI-RSs and/or SSBs) that are periodically transmitted to the UE 120.

As further shown in FIG. 7, and by reference number 715, the UE 120 may detect beam failure for the first beam group. The UE 120 may monitor the first BFD reference signal set and the second BFD reference signal set and perform measurements (e.g., RSRP measurements) on the first BFD reference signal set and the second BFD reference signal set as the first and second BFD reference signal sets are periodically transmitted to the UE 120. The UE 120 may compare the measurements (e.g., RSRP measurements) on the first BFD reference signal set and the second BFD reference signal set with a threshold (Qout). The UE 120 may detect a beam failure indication for the first beam group (e.g., for the first TRP 705-1) based at least in part on the measurements (e.g., RSRP measurements) for an occurrence of the first BFD reference signal set being below Qout. The UE 120 may detect a beam failure indication for the second beam group (e.g., for the second TRP 705-2) based at least in part on the measurements (e.g., RSRP measurements) for an occurrence of the second BFD reference signal set being below Qout. The UE 120 may detect beam failure for the first beam group (e.g., for the first TRP 705-1) based at least in part on detecting more than a threshold number of beam failure indications in a time duration associated with a BFD timer.

As further shown in FIG. 7, and by reference number 720, the UE 120 may determine an availability of uplink resources in the second beam group for a per beam group BFR request based at least in part on detecting beam failure for the first beam group. In some aspects, the UE 120 may determine whether one or more PUCCH scheduling request resources are available for transmitting a BFR scheduling request on a beam in the second beam group, and/or the UE 120 may determine whether one or more PUSCH resources are available for transmitting a BFR MAC-CE on a beam in the second beam group.

In some aspects, the UE 120 may determine whether a PUCCH scheduling request resource dedicated to per beam group (e.g., per TRP) BFR scheduling requests is configured in the second beam group. In some aspects, the UE 120 may receive (e.g., prior to detecting beam failure for the first beam set), configuration information that configures one or more PUCCH scheduling request resources dedicated to per beam group BFR scheduling requests. For example, the UE 120 may receive the configuration information in an RRC message from the first TRP 705-1 or the second TRP 705-2. In some aspects, the configuration information may configure a dedicated PUCCH scheduling resource in each of the first and second beam groups. For example, the configuration information may include a mapping of a PUCCH scheduling request dedicated to BFR for the first beam group (e.g., BFR for the first TRP 705-1) to a beam of the second beam group (e.g., a beam associated with the second TRP 705-2). The configuration may further include a mapping of a PUCCH scheduling request dedicated to BFR for the second beam group (e.g., BFR for the second TRP 705-2) to a beam of the first beam group (e.g., a beam associated with the first TRP 705-1). In some aspects, the configuration information may configure a single PUCCH scheduling request resource dedicated to per beam group BFR in the first beam group or the second beam group. In some aspects, no PUCCH scheduling request resources dedicated to per beam group BFR may be configured in either the first beam group or the second beam group.

In some aspects, the UE 120 may determine whether one or more PUCCH scheduling request resources, including PUCCH scheduling request resources that are not dedicated to per beam group BFR, are available in the second beam group. For example, the UE 120 may determine whether at least one PUCCH scheduling request resource is available that is configured to use at least a beam associated with the working TRP (e.g., the second TRP 705-2). In this case, a PUCCH scheduling request resource configured to use at least a beam in the second beam group may be determined to be available based at least in part on a determination that the PUCCH scheduling request resource does not collide with a semi-persistent downlink symbol configured via RRC signaling, or a dynamic downlink symbol indicated by an slot frame indication (SFI).

In some aspects, the UE 120 may determine whether an existing scheduled PUSCH resource is available in the second beam group. For example, the existing scheduled PUSCH resource may be a grant-free PUSCH resource that is periodically scheduled in the second beam group for the UE 120. In some aspects, the UE 120 may determine whether an existing scheduled PUSCH resource (e.g., a grant free PUSCH resource) is available that is configured to use a TCI state and/or spatial relationship information associated with the working TRP (e.g., the second TRP 705-2). In some aspects, the UE 120 may determine whether an existing scheduled PUSCH resource (e.g., a grant free PUSCH resource) that is large enough to accommodate a MAC-CE (e.g., the BFR MAC-CE) is available in the second beam group. In some aspects, the existing scheduled PUSCH resource may be configured to be transmitted on any component carrier. In some aspects, the UE 120 may determine whether the existing scheduled PUSCH resource is configured to be transmitted on a Pcell, an PScell, an Scell configured with PUCCH, and/or another component carrier configured to transmit a PUCCH scheduling request.

As further shown in FIG. 7, and by reference number 725, the UE 120 may transmit a BFR request. In some aspects, the UE 120 may selectively transmit the BFR request for the first beam group based at least in part on the determination of uplink resource availability in the second beam group. The BFR request may refer to the BFR scheduling request (e.g., to schedule an uplink grant for a BFR MAC-CE), the BFR MAC-CE, both the BFR scheduling request and the BFR MAC-CE, and/or a RACH BFR request. The UE 120 may select whether to transmit the BFR request and may select which type of BFR request to transmit (e.g., the BFR scheduling request, the BFR MAC-CE (without a scheduling request), or the RACH BFR request) based at least in part on the determination of uplink resource availability in the second beam group.

In some aspects, the UE 120 may transmit the BFR scheduling request on a beam in the second beam group using a PUCCH scheduling request resource dedicated to per beam group BFR (e.g., dedicated to BFR for the first beam group), based at least in part on a determination that the dedicated PUCCH scheduling request is configured on a beam in the second beam group.

In some aspects, the UE 120 may transmit the BFR scheduling request using an earliest available PUCCH scheduling request resource on a beam of the second beam group, based at least in part on a determination that one or more PUCCH scheduling resources are available in the second beam group. In this case, the earliest available PUCCH scheduling resource may be a PUCCH scheduling request resource dedicated to per beam group BFR or another PUCCH scheduling request resource that is not dedicated to per beam group BFR.

The earliest available PUCCH scheduling request may use at least a beam associated with the second beam group (e.g., a beam associated with the working TRP). In some aspects, the earliest available PUCCH scheduling request resource may be associated with a first spatial relationship associated with the beam of the second beam group and associated with as second spatial relationship associated with a beam of the first beam group. For example, the PUCCH scheduling request resource may be configured with two beams, one beam to be transmitted to the first TRP 705-1 and another beam to be transmitted to second TRP

705-2. In some aspects, the UE 120 may only transmit the BFR scheduling request via the beam associated with the working TRP (e.g., the beam associated with the second TRP 705-2). For example, the UE 120 may transmit the BFR scheduling request using the earliest available PUCCH scheduling request resource on the beam of the second beam group without transmitting the BFR recovery request on the beam of the first beam group. In some aspects, the UE 120 may transmit the BFR scheduling request on all beams configured for the earliest available scheduling request, regardless of the failed TRP (e.g., the first TRP 705-1). For example, the UE 120 may transmit the BFR scheduling request using the earliest available PUCCH scheduling request resource on the beam of the second beam group and on the beam of the first beam group.

In a case in which the UE 120 transmits the BFR scheduling request using a PUCCH scheduling request resource, on a beam of the second beam group (e.g., to the second TRP 705-2), the UE 120 may receive, from the second TRP 705-2, an uplink grant that schedules a PUSCH resource for transmitting the BFR MAC-CE. The UE 120 may perform candidate beam detection to select a candidate beam for the first beam group. For example, the UE 120 may select the candidate beam based on measurements performed on reference signals in a new beam information reference signal set. The UE 120 may transmit the BFR MAC-CE using the PUSCH resource granted by the uplink grant. For example, the granted PUSCH resource may be scheduled and transmitted on a beam in the second beam group (e.g., a beam to the second TRP 705-2) or on a beam in the first group (e.g., a beam to the first TRP 705-1). In some aspects, the BFR MAC-CE may include an indication of the selected candidate beam, such as an index associated with the corresponding reference signal in the new beam information reference signal set. The BFR MAC-CE may also include an indication of the failed TRP (e.g. the first TRP 705-1), such as index associated with the failed TRP.

In some aspects, the UE 120 may transmit the BFR MAC-CE using an existing scheduled PUSCH resource (e.g., a grant free PUSCH resource) on a beam of the second beam group, without transmitting a BFR scheduling request, based at least in part on a determination that the existing scheduled PUSCH resource is available and based at least in part on a determination that a size of the existing scheduled PUSCH resource is large enough to transmit the BFR MAC-CE. In this case, the existing scheduled PUSCH resource may be a scheduled PUSCH resource that uses a TCI state and/or spatial relationship information associated with a beam in the second beam group associated with working TRP (e.g., the second TRP 705-2). In some aspects, the UE 120 may select to transmit the BFR MAC-CE using the existing scheduled PUSCH resource based at least in part on a component carrier associated with the existing scheduled PUSCH resource. For example, the UE 120 may select to transmit the BFR MAC-CE using the existing scheduled PUSCH resource based at least in part on a determination that the component carrier is a Pcell, a PScell, an Scell configured with PUCCH, and/or another component carrier that is configured to transmit PUCCH scheduling requests. In some aspects, the UE 120 may select to transmit the BFR MAC-CE using the existing scheduled PUSCH resource on a component carrier configured for the existing scheduled PUSCH resource.

In some aspects, the UE 120 may determine that there is no PUCCH scheduling request resource that is dedicated to per beam group BFR configured in the second beam group. For example, in this case, there may be a single dedicated PUCCH scheduling request resource configured in the first beam group, or there may be no configured dedicated PUCCH scheduling request resources. In some aspects, based at least in part on the determination that there is no PUCCH scheduling request resource that is dedicated to per beam group BFR configured in the second beam group, the UE 120 may transmit a BFR scheduling request using a non-dedicated PUCCH scheduling request resource associated with the second beam group (based at least in part on a determination that the non-dedicated PUCCH scheduling request is available), or the UE 120 may transmit a BFR MAC-CE using an existing scheduled PUSCH associated with the second beam group (based at least in part on a determination that the existing scheduled PUSCH resource is available).

In some aspects, based at least in part on a determination that a single dedicated PUCCH scheduling request resource is configured in the first beam group, the UE 120 may transmit a BFR scheduling request using the dedicated PUCCH scheduling request resource on a beam in the first beam group (e.g., on a beam to the first TRP 705-1), even though the first beam group may be associated with the failed TRP. For example, the UE 120 may transmit the BFR scheduling request instead or in addition to transmitting the BFR scheduling request and/or the BFR MAC-CE on a beam in the second beam group.

In some aspects, the UE 120 may select an earliest available resource among a dedicated PUCCH scheduling resource configured in the second beam group, an earliest available non-dedicated PUCCH scheduling resource in the second beam group, and an existing scheduled PUSCH resource in the second beam group. In some aspects, the UE 120 may predict whether an earliest available PUCCH scheduling request resource (e.g., dedicated or non-dedicated) will result in an earlier scheduled PUSCH resource (via an uplink grant) than an earliest available existing scheduled PUSCH resource. In this case, the UE 120 may select to transmit a BFR scheduling request using the earliest available PUCCH scheduling request resource based at least in part on a prediction that the earliest available PUCCH scheduling request resource will result in an earlier scheduled PUSCH resource than the earliest available existing scheduled PUSCH resource. The UE 120 may select to transmit the BFR MAC-CE using the earliest existing scheduled PUSCH resource (without transmitting a BFR scheduling request) based at least in part on a prediction that the earliest available PUCCH scheduling request resource will not result in an earlier scheduled PUSCH resource than the earliest existing scheduled PUSCH resource.

In some aspects, the UE 120 may select not to transmit a BFR request for the first beam group based at least in part on a determination that there is no PUCCH scheduling request resource dedicated to per beam group BFR configured in the second beam group, based at least in part on a determination that there is no other PUCCH scheduling resource associated with the second beam group available, and based at least in part on a determination that there is no existing scheduled PUSCH resource associated with the second beam group available. In this case, the UE 120 may declare cell level beam failure for the cell based at least in part on selecting not to transmit the BFR request for the first beam group. For example, in this case, the UE 120 may declare cell level beam failure even if there is a still working TRP (e.g., the second TRP 705-2).

In some aspects, the UE 120 may perform a RACH procedure to transmit the BFR request for the first beam group based at least in part on a determination that there are no available uplink resources in the second beam group for transmitting the beam failure recovery request.

As further shown in FIG. 7, and by reference number 730, the UE 120 may receive a BFR response based at least in part on transmitting the BFR request. In some aspects, the second TRP 705-2 may transmit the BFR response to the UE 120, as shown in FIG. 7. In some aspects, the first TRP 705-1 may transmit the BFR response to the UE 120.

In some aspects, the BFR response may be a response to a BFR MAC-CE. In this case, the BFR response may include an uplink grant that schedules a new transmission (e.g., with a toggled NDI) for the same HARQ process as the PUSCH communication carrying the BFR MAC-CE. This BFR response indicates, to the UE 120, to use the selected beam candidate indicated in the BFR MAC-CE for the communications with the first TRP 705-1. In this case, after a number of symbols (e.g., 28 symbols) from an end of the BFR response the UE 120 may reset all CORESET beams associated with the first TRP 705-1 to the selected beam candidate and/or reset PUCCH beams associated with the first TRP 705-1 to the selected beam candidate.

In some aspects, the BFR response may be a random access response to a RACH BFR request. In a case in which the RACH BFR request is transmitted using a selected candidate beam of the first beam group, the BFR response may indicate, to the UE 120, to use a selected beam candidate for communications with the first TRP 705-1. In a case in which the RACH BFR request is transmitted on a beam of the second beam group, the BFR response may include an uplink grant for the UE 120 to transmit a MAC-CE (e.g., BFR MAC-CE) that includes an indication of the selected candidate beam.

As described above in connection with FIG. 7, the UE 120 may detect beam failure for the first beam group. The UE 120 may selectively transmit a BFR request for the first beam group based at least in part on a determination of uplink resource availability in the second beam group. The first beam group may be associated with the first TRP 705-1 and the second beam group may be associated with the second TRP 705-2. In some aspects, based at least in part on the determination of the uplink resource availability in the second beam group, the UE 120 may transmit a BFR scheduling request on a beam of the second beam group using a PUCCH scheduling request resource dedicated to BFR for the first beam group, the UE 120 may transmit a BFR scheduling request using an earliest available PUCCH scheduling request resource on a beam of the second beam group, or the UE 120 may transmit a BFR MAC-CE using an existing scheduled PUSCH resource on a beam of the second beam group. As a result, the UE 120 may select an available uplink resource in a case in which there are no dedicated resources configured in the second beam group. This may reduce cases in which the UE 120 cannot transmit per beam group or per TRP BFR requests, thus reducing delays in beam failure recover, decreasing latency of uplink and/or downlink traffic, and increasing network speed. Furthermore, the UE 120 may select the uplink resource based at least in part on a determination of an earliest available network resource, which may decrease latency associated with requesting BFR.

As indicated above, FIG. 7 is provided as an example. Other examples may differ from what is described with respect to FIG. 7.

Figure 8:
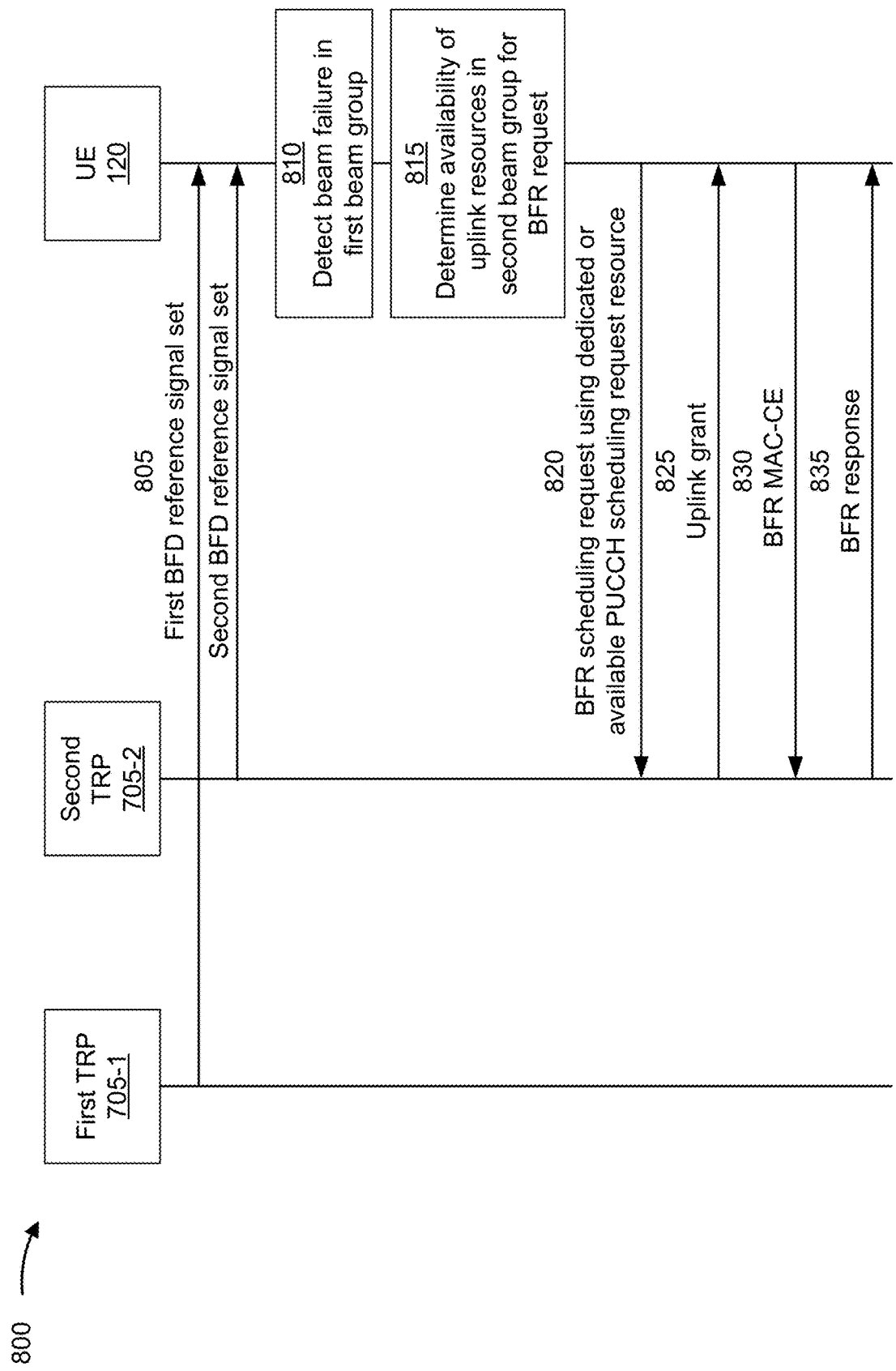

FIG. 8 is a diagram illustrating an example 800 associated with BFR requests for per beam group BFR, in accordance with the present disclosure. As shown in FIG. 8, example 800 includes communication between a UE 120, a first TRP 705-1, and a second TRP 705-2. In some aspects, the first TRP 705-1, the second TRP 705-2, and UE 120 may be included in a wireless network, such as wireless network 100. The UE 120 may communicate with the first TRP 705-1 and the second TRP 705-2 via wireless access links, which may include uplinks and downlinks.

The first TRP 705-1 and the second TRP 705-2 (collectively, TRPs 705) may correspond to TRPs described elsewhere herein, such as TRPs 535 described above in connection with FIG. 5 and/or TRPs 605 described above in connection with FIG. 6. The TRPs 705 may communicate with each other and may coordinate communications with the UE 120 via an interface between the TRPs 705 (e.g., a backhaul interface and/or an access node controller). The TRPs 705 may be in the same cell. For example, the TRPs 705 may be DUs associated with the same 5G access node (e.g., gNB). In some aspects, the TRPs 705 may be co-located at the same base station 110. For example, the TRPs 705 may be different antenna arrays or panels of the same base station 110. In some aspects, the TRPs 705 may be located at different base station 110 in the same cell. The TRPs 705 may be associated with different beam groups in the cell. For example, a first beam group in the cell may be associated with the first TRP 705-1 and a second beam group in the cell may be associated with the second TRP 705-2.

As shown in FIG. 8, and by reference number 805, the UE 120 may receive, from the first TRP 705-1, a first BFD reference signal set associated with the first beam group, and the UE 120 may receive, from the second TRP 705-2, a second BFD reference signal set associated with the second beam group. Each BFD reference signal set (e.g., the first BFD reference signal set and the second BFD reference signal set) may include one or more reference signals (e.g., CSI-RSs and/or SSBs) that are periodically transmitted to the UE 120.

As further shown in FIG. 8, and by reference number 810, the UE 120 may detect beam failure for the first beam group. The UE 120 may monitor the first BFD reference signal set and the second BFD reference signal set and perform measurements (e.g., RSRP measurements) on the first BFD reference signal set and the second BFD reference signal set as the first and second BFD reference signal sets are periodically transmitted to the UE 120. The UE 120 may compare the measurements (e.g., RSRP measurements) on the first BFD reference signal set and the second BFD reference signal set with a threshold (Qout). The UE 120 may detect a beam failure indication for the first beam group (e.g., for the first TRP 705-1) based at least in part on the measurements (e.g., RSRP measurements) for an occurrence of the first BFD reference signal set being below Qout. The UE 120 may detect a beam failure indication for the second beam group (e.g., for the second TRP 705-2) based at least in part on the measurements (e.g., RSRP measurements) for an occurrence of the second BFD reference signal set being below Qout. The UE 120 may detect beam failure for the first beam group (e.g., for the first TRP 705-1) based at least in part on detecting more than a threshold number of beam failure indications in a time duration associated with a BFD timer.

As further shown in FIG. 8, and by reference number 815, the UE 120 may determine an availability of uplink resources in the second beam group for a per beam group BFR request based at least in part on detecting beam failure for the first beam group. In some aspects, such as in example 800 of FIG. 8, the UE 120 may determine that one or more PUCCH scheduling request resources are available for transmitting a BFR scheduling request on a beam in the second beam group. For example, the one or more available PUCCH scheduling request resources may include a PUCCH scheduling request resource dedicated to per beam group (e.g., per TRP) BFR configured on a beam of the second beam group and/or one or more available non-dedicated PUCCH scheduling request resources in the second beam group.

As further shown in FIG. 8, and by reference number 820, the UE 120 may transmit a BFR scheduling request using a dedicated or other available PUCCH scheduling request resource in the second beam group. In some aspects, the UE 120 may select to transmit the BFR scheduling request using the PUCCH scheduling request resource in the second beam group based at least in part on the determination of uplink resource availability in the second beam group.

In some aspects, the UE 120 may transmit the BFR scheduling request on a beam in the second beam group using a PUCCH scheduling request resource dedicated to per beam group BFR (e.g., dedicated to BFR for the first beam group), based at least in part on a determination that the dedicated PUCCH scheduling request is configured on a beam in the second beam group.

In some aspects, the UE 120 may transmit the BFR scheduling request using an earliest available PUCCH scheduling request resource on a beam of the second beam group, based at least in part on a determination that one or more PUCCH scheduling resources are available in the second beam group. In this case, the earliest available PUCCH scheduling resource may be a PUCCH scheduling request resource dedicated to per beam group BFR or another PUCCH scheduling request resource that is not dedicated to per beam group BFR.

The earliest available PUCCH scheduling request may use at least a beam associated with the second beam group (e.g., a beam associated with the working TRP). In some aspects, the earliest available PUCCH scheduling request resource may be associated with a first spatial relationship associated with the beam of the second beam group and associated with as second spatial relationship associated with a beam of the first beam group. For example, the PUCCH scheduling request resource may be configured with two beams, one beam to be transmitted to the first TRP 705-1 and another beam to be transmitted to second TRP 705-2. In some aspects, the UE 120 may only transmit the BFR scheduling request via the beam associated with the working TRP (e.g., the beam associated with the second TRP 705-2). For example, the UE 120 may transmit the BFR scheduling request using the earliest available PUCCH scheduling request resource on the beam of the second beam group without transmitting the BFR recovery request on the beam of the first beam group. In some aspects, the UE 120 may transmit the BFR scheduling request on all beams configured for the earliest available scheduling request, regardless of the failed TRP (e.g., the first TRP 705-1). For example, the UE 120 may transmit the BFR scheduling request using the earliest available PUCCH scheduling request resource on the beam of the second beam group and on the beam of the first beam group.

In some aspects, the UE 120 may transmit the BFR scheduling request using a non-dedicated PUCCH scheduling request resource associated with the second beam group based at least in part on a determination that the non-dedicated PUCCH scheduling request is available and based at least in part on a determination that there is no PUCCH scheduling request resource that is dedicated to per beam group BFR configured in the second beam group. For example, in this case, there may be a single dedicated PUCCH scheduling request resource configured in the first beam group, or there may be no configured dedicated PUCCH scheduling request resources.

In some aspects, the UE 120 may transmit the BFR scheduling request on an earliest available PUCCH scheduling request resource (e.g., dedicated or non-dedicated PUCCH scheduling request resource) associated with the second beam group based at least in part on a determination that the earliest available PUCCH scheduling request resource is an earliest available resource among a dedicated PUCCH scheduling resource configured in the second beam group, an earliest available non-dedicated PUCCH scheduling resource in the second beam group, and an existing scheduled PUSCH resource in the second beam group. In some aspects, the UE 120 may select to transmit the BFR scheduling request using the earliest available PUCCH scheduling request resource based at least in part on a prediction that the earliest available PUCCH scheduling request resource will result in an earlier scheduled PUSCH resource than an earliest available existing scheduled PUSCH resource.

As further shown in FIG. 8, and by reference number 825, the UE 120 may receive, from the second TRP 705-2, an uplink grant based at least in a part on transmitting the BFR scheduling request to the second TRP 705-2 on a beam in the second beam group. The uplink grant may schedule a PUSCH resource for transmitting a BFR MAC-CE.

As further shown in FIG. 8, and by reference number 830, the UE 120 may transmit the BFR MAC-CE using the scheduled PUSCH resource granted by the uplink grant. The UE 120 may perform candidate beam detection to select a candidate beam for the first beam group. For example, the UE 120 may select the candidate beam based on measurements performed on reference signals in a new beam information reference signal set. In some aspects, the BFR MAC-CE may include an indication of the selected candidate beam, such as an index associated with the corresponding reference signal in the new beam information reference signal set. In some aspects, the BFR MAC-CE may also include an indication of the failed TRP (e.g. the first TRP 705-1), such as index associated with the failed TRP. In some aspects, the granted PUSCH resource may be scheduled on a beam in the second beam group (e.g., a beam to the second TRP 705-2). In this case, as shown in FIG. 8, the UE 120 may transmit the BFR MAC-CE to the second TRP 705-2 on the beam in the second beam group. In some aspects, the granted PUSCH resource may be scheduled on a beam in the first group (e.g., a beam to the first TRP 705-1). In this case, the UE 120 may transmit the BFR MAC-CE to the first TRP 705-1 on the beam in the first beam group.

As further shown in FIG. 8, and by reference number 835, the UE 120 may receive a BFR response based at least in part on transmitting the BFR MAC-CE. In some aspects, the second TRP 705-2 may transmit the BFR response to the UE 120, as shown in FIG. 8. In some aspects, the first TRP 705-1 may transmit the BFR response to the UE 120. In some aspects, the BFR response may be a response to the BFR MAC-CE. In this case, the BFR response may include an uplink grant that schedules a new transmission (e.g., with a toggled NDI) for the same HARQ process as the PUSCH communication carrying the BFR MAC-CE. This BFR response indicates, to the UE 120, to use the selected beam candidate indicated in the BFR MAC-CE for the communications with the first TRP 705-1. In this case, after a number of symbols (e.g., 28 symbols) from an end of the BFR response the UE 120 may reset all CORESET beams associated with the first TRP 705-1 to the selected beam candidate and/or reset PUCCH beams associated with the first TRP 705-1 to the selected beam candidate.

As indicated above, FIG. 8 is provided as an example. Other examples may differ from what is described with respect to FIG. 8.

Figure 9:
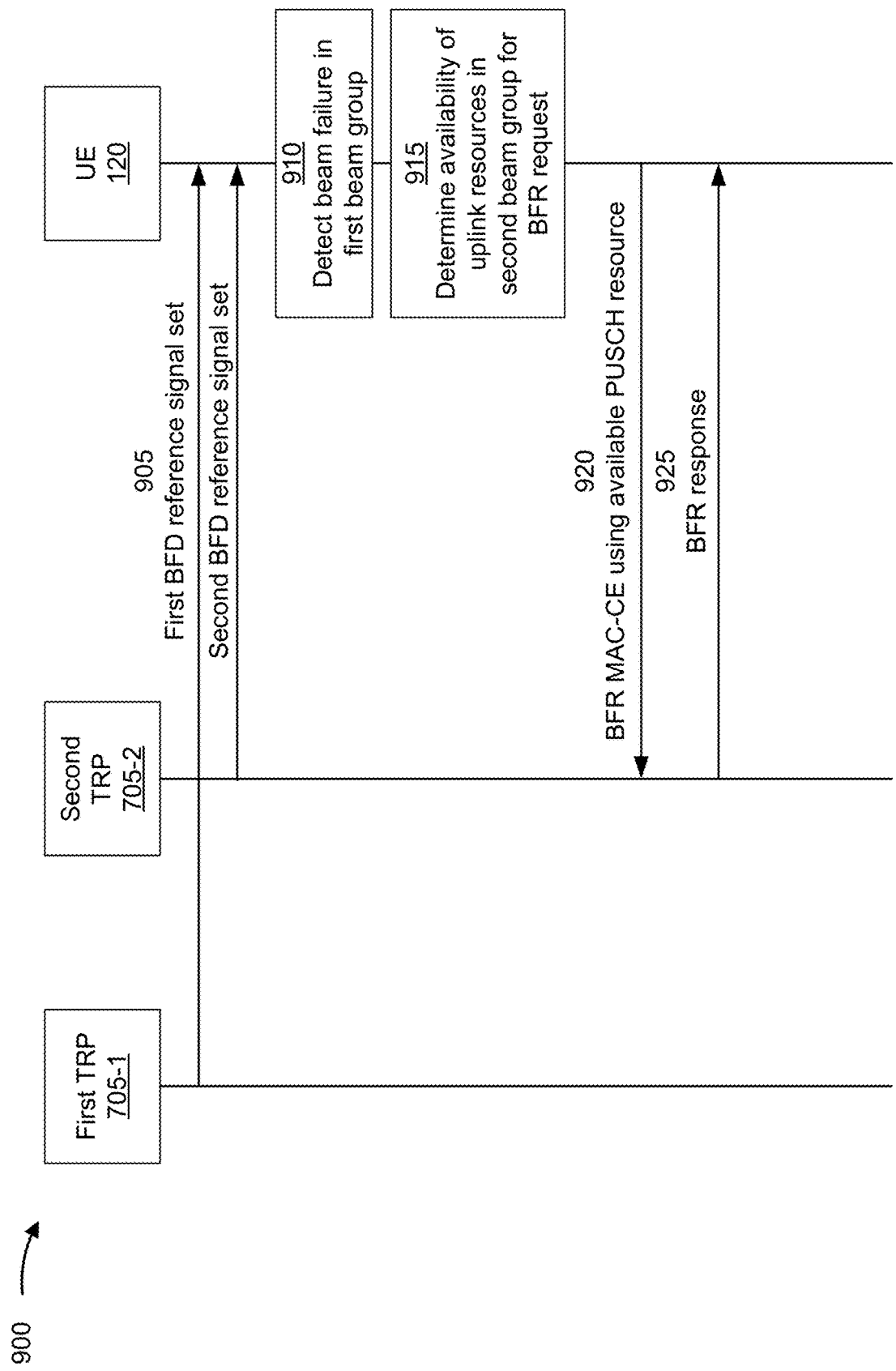

FIG. 9 is a diagram illustrating an example 900 associated with BFR requests for per beam group BFR, in accordance with the present disclosure. As shown in FIG. 9, example 900 includes communication between a UE 120, a first TRP 705-1, and a second TRP 705-2. In some aspects, the first TRP 705-1, the second TRP 705-2, and UE 120 may be included in a wireless network, such as wireless network 100. The UE 120 may communicate with the first TRP 705-1 and the second TRP 705-2 via wireless access links, which may include uplinks and downlinks.

The first TRP 705-1 and the second TRP 705-2 (collectively, TRPs 705) may correspond to TRPs described elsewhere herein, such as TRPs 535 described above in connection with FIG. 5 and/or TRPs 605 described above in connection with FIG. 6. The TRPs 705 may communicate with each other and may coordinate communications with the UE 120 via an interface between the TRPs 705 (e.g., a backhaul interface and/or an access node controller). The TRPs 705 may be in the same cell. For example, the TRPs 705 may be DUs associated with the same 5G access node (e.g., gNB). In some aspects, the TRPs 705 may be co-located at the same base station 110. For example, the TRPs 705 may be different antenna arrays or panels of the same base station 110. In some aspects, the TRPs 705 may be located at different base station 110 in the same cell. The TRPs 705 may be associated with different beam groups in the cell. For example, a first beam group in the cell may be associated with the first TRP 705-1 and a second beam group in the cell may be associated with the second TRP 705-2.

As shown in FIG. 9, and by reference number 905, the UE 120 may receive, from the first TRP 705-1, a first BFD reference signal set associated with the first beam group, and the UE 120 may receive, from the second TRP 705-2, a second BFD reference signal set associated with the second beam group. Each BFD reference signal set (e.g., the first BFD reference signal set and the second BFD reference signal set) may include one or more reference signals (e.g., CSI-RSs and/or SSBs) that are periodically transmitted to the UE 120.

As further shown in FIG. 9, and by reference number 910, the UE 120 may detect beam failure for the first beam group. The UE 120 may monitor the first BFD reference signal set and the second BFD reference signal set and perform measurements (e.g., RSRP measurements) on the first BFD reference signal set and the second BFD reference signal set as the first and second BFD reference signal sets are periodically transmitted to the UE 120. The UE 120 may compare the measurements (e.g., RSRP measurements) on the first BFD reference signal set and the second BFD reference signal set with a threshold (Qout). The UE 120 may detect a beam failure indication for the first beam group (e.g., for the first TRP 705-1) based at least in part on the measurements (e.g., RSRP measurements) for an occurrence of the first BFD reference signal set being below Qout. The UE 120 may detect a beam failure indication for the second beam group (e.g., for the second TRP 705-2) based at least in part on the measurements (e.g., RSRP measurements) for an occurrence of the second BFD reference signal set being below Qout. The UE 120 may detect beam failure for the first beam group (e.g., for the first TRP 705-1) based at least in part on detecting more than a threshold number of beam failure indications in a time duration associated with a BFD timer.

As further shown in FIG. 9, and by reference number 915, the UE 120 may determine an availability of uplink resources in the second beam group for a per beam group BFR request based at least in part on detecting beam failure for the first beam group. In some aspects, such as in example 900 of FIG. 9, the UE 120 may determine that an existing scheduled PUSCH resource is available in the second beam group. For example, the existing scheduled PUSCH resource may be a grant-free PUSCH resource that is periodically scheduled in the second beam group for the UE 120.

In some aspects, the UE 120 may determine that an existing scheduled PUSCH resource (e.g., a grant free PUSCH resource) is available that is configured to use a TCI state and/or spatial relationship information associated with the working TRP (e.g., the second TRP 705-2). In some aspects, the UE 120 may determine that an existing scheduled PUSCH resource (e.g., a grant free PUSCH resource) that is large enough to accommodate a MAC-CE (e.g., the BFR MAC-CE) is available in the second beam group. In some aspects, the existing scheduled PUSCH resource may be configured to be transmitted on any component carrier. In some aspects, the UE 120 may determine whether the existing scheduled PUSCH resource is configured to be transmitted on a Pcell, an PScell, an Scell configured with PUCCH, and/or another component carrier configured to transmit a PUCCH scheduling request.

As further shown in FIG. 9, and by reference number 920, the UE 120 may transmit a BFR MAC-CE using the available existing PUSCH resource in the second beam group. For example, the UE 120 may transmit the BFR MAC-CE to the second TRP 705-2 on a beam of the second beam group using the available existing PUSCH. In some aspects, the UE 120 may select to transmit the BFR MAC-CE using the available existing PUSCH resource in the second beam group based at least in part on the determination of uplink resource availability in the second beam group.

In some aspects, the UE 120 may transmit the BFR MAC-CE using the existing scheduled PUSCH resource (e.g., a grant free PUSCH resource) on a beam of the second beam group, without transmitting a BFR scheduling request, based at least in part on a determination that the existing scheduled PUSCH resource is available and based at least in part on a determination that a size of the existing scheduled PUSCH resource is large enough to transmit the BFR MAC-CE. In this case, the existing scheduled PUSCH resource may be a scheduled PUSCH resource that uses a TCI state and/or spatial relationship information associated with a beam in the second beam group associated with working TRP (e.g., the second TRP 705-2). In some aspects, the UE 120 may select to transmit the BFR MAC-CE using the existing scheduled PUSCH resource based at least in part on a component carrier associated with the existing scheduled PUSCH resource. For example, the UE 120 may select to transmit the BFR MAC-CE using the existing scheduled PUSCH resource based at least in part on a determination that the component carrier is a Pcell, a PScell, an Scell configured with PUCCH, and/or another component carrier that is configured to transmit PUCCH scheduling requests. In some aspects, the UE 120 may select to transmit the BFR MAC-CE using the existing scheduled PUSCH resource on a component carrier configured for the existing scheduled PUSCH resource.

In some aspects, the UE 120 may transmit the BFR MAC-CE using the existing scheduled PUSCH resource in the second beam group based at least in part on a determination that the existing scheduled PUSCH resource is available and based at least in part on a determination that there is no PUCCH scheduling request resource that is dedicated to per beam group BFR configured in the second beam group. For example, in this case, there may be a single dedicated PUCCH scheduling request resource configured in the first beam group, or there may be no configured dedicated PUCCH scheduling request resources.

In some aspects, the UE 120 may transmit the BFR MAC-CE using the existing scheduled PUSCH resource in the second beam group based at least in part on a determination that the existing scheduled PUSCH resource is an earliest available resource among a dedicated PUCCH scheduling resource configured in the second beam group, an earliest available non-dedicated PUCCH scheduling resource in the second beam group, and the existing scheduled PUSCH resource in the second beam group. In some aspects, the UE 120 may select to transmit the BFR MAC-CE using the existing scheduled PUSCH resource (without transmitting a BFR scheduling request) based at least in part on a prediction that the earliest available PUCCH scheduling request resource in the second beam group will not result in an earlier scheduled PUSCH resource than the existing scheduled PUSCH resource.

The UE 120 may perform candidate beam detection to select a candidate beam for the first beam group. For example, the UE 120 may select the candidate beam based on measurements performed on reference signals in a new beam information reference signal set. In some aspects, the BFR MAC-CE may include an indication of the selected candidate beam, such as an index associated with the corresponding reference signal in the new beam information reference signal set. In some aspects, the BFR MAC-CE may also include an indication of the failed TRP (e.g. the first TRP 705-1), such as index associated with the failed TRP.

As further shown in FIG. 9, and by reference number 925, the UE 120 may receive a BFR response based at least in part on transmitting the BFR MAC-CE. For example, the second TRP 705-2 may transmit the BFR response to the UE 120 based at least in part on receiving the BFR MAC-CE. In some aspects, the BFR response may be a response to the BFR MAC-CE. In this case, the BFR response may include an uplink grant that schedules a new transmission (e.g., with a toggled NDI) for the same HARQ process as the PUSCH communication carrying the BFR MAC-CE. This BFR response indicates, to the UE 120, to use the selected beam candidate indicated in the BFR MAC-CE for the communications with the first TRP 705-1. In this case, after a number of symbols (e.g., 28 symbols) from an end of the BFR response the UE 120 may reset all CORESET beams associated with the first TRP 705-1 to the selected beam candidate and/or reset PUCCH beams associated with the first TRP 705-1 to the selected beam candidate.

As indicated above, FIG. 9 is provided as an example. Other examples may differ from what is described with respect to FIG. 9.

Figure 10:
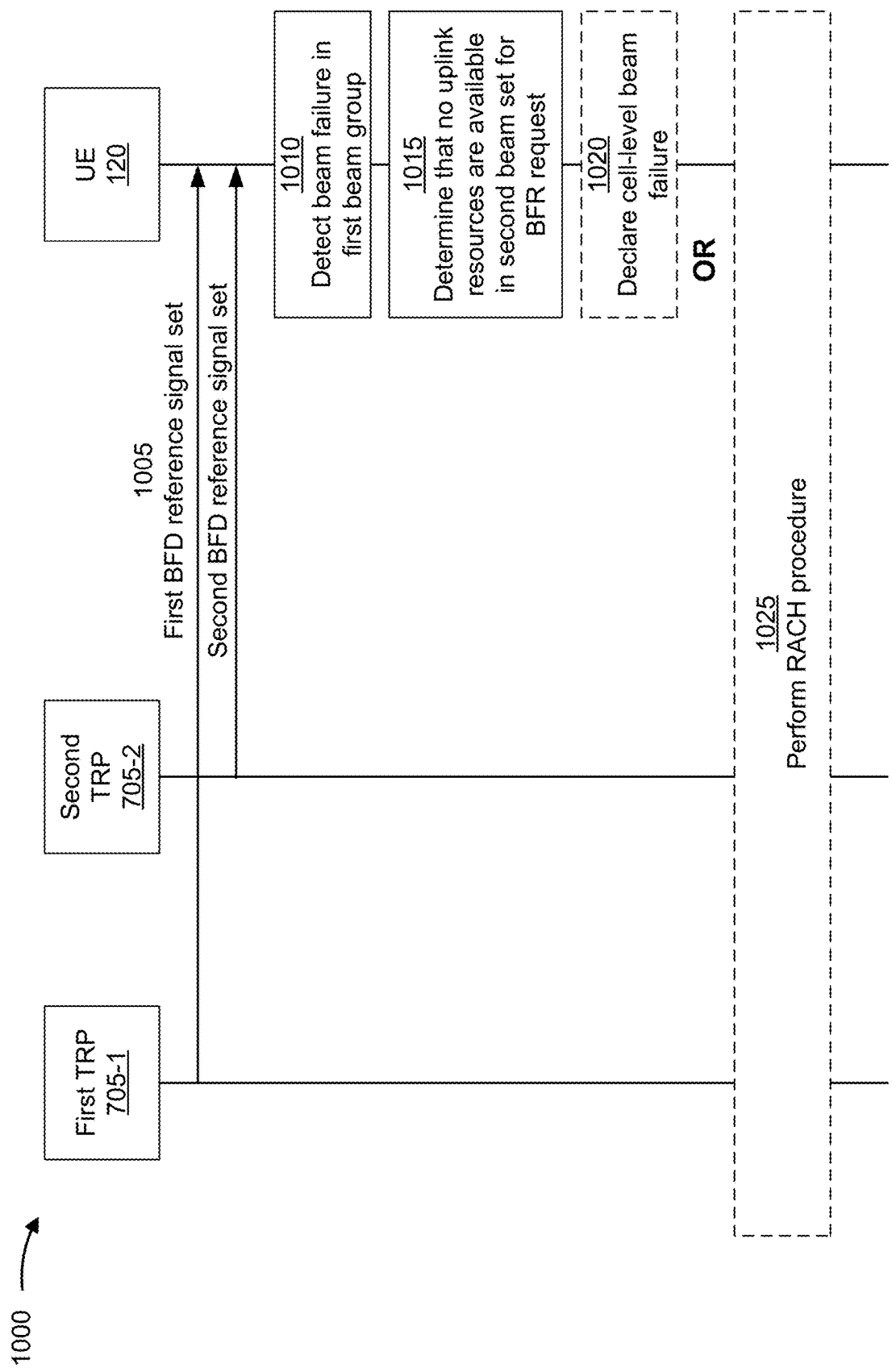

FIG. 10 is a diagram illustrating an example 1000 associated with BFR requests for per beam group BFR, in accordance with the present disclosure. As shown in FIG. 10, example 1000 includes communication between a UE 120, a first TRP 705-1, and a second TRP 705-2. In some aspects, the first TRP 705-1, the second TRP 705-2, and UE 120 may be included in a wireless network, such as wireless network 100. The UE 120 may communicate with the first TRP 705-1 and the second TRP 705-2 via wireless access links, which may include uplinks and downlinks.

The first TRP 705-1 and the second TRP 705-2 (collectively, TRPs 705) may correspond to TRPs described elsewhere herein, such as TRPs 535 described above in connection with FIG. 5 and/or TRPs 605 described above in connection with FIG. 6. The TRPs 705 may communicate with each other and may coordinate communications with the UE 120 via an interface between the TRPs 705 (e.g., a backhaul interface and/or an access node controller). The TRPs 705 may be in the same cell. For example, the TRPs 705 may be DUs associated with the same 5G access node (e.g., gNB). In some aspects, the TRPs 705 may be co-located at the same base station 110. For example, the TRPs 705 may be different antenna arrays or panels of the same base station 110. In some aspects, the TRPs 705 may be located at different base station 110 in the same cell. The TRPs 705 may be associated with different beam groups in the cell. For example, a first beam group in the cell may be associated with the first TRP 705-1 and a second beam group in the cell may be associated with the second TRP 705-2.

As shown in FIG. 10, and by reference number 1005, the UE 120 may receive, from the first TRP 705-1, a first BFD reference signal set associated with the first beam group, and the UE 120 may receive, from the second TRP 705-2, a second BFD reference signal set associated with the second beam group. Each BFD reference signal set (e.g., the first BFD reference signal set and the second BFD reference signal set) may include one or more reference signals (e.g., CSI-RSs and/or SSBs) that are periodically transmitted to the UE 120.

As further shown in FIG. 10, and by reference number 1010, the UE 120 may detect beam failure for the first beam group. The UE 120 may monitor the first BFD reference signal set and the second BFD reference signal set and perform measurements (e.g., RSRP measurements) on the first BFD reference signal set and the second BFD reference signal set as the first and second BFD reference signal sets are periodically transmitted to the UE 120. The UE 120 may compare the measurements (e.g., RSRP measurements) on the first BFD reference signal set and the second BFD reference signal set with a threshold (Qout). The UE 120 may detect a beam failure indication for the first beam group (e.g., for the first TRP 705-1) based at least in part on the measurements (e.g., RSRP measurements) for an occurrence of the first BFD reference signal set being below Qout. The UE 120 may detect a beam failure indication for the second beam group (e.g., for the second TRP 705-2) based at least in part on the measurements (e.g., RSRP measurements) for an occurrence of the second BFD reference signal set being below Qout. The UE 120 may detect beam failure for the first beam group (e.g., for the first TRP 705-1) based at least in part on detecting more than a threshold number of beam failure indications in a time duration associated with a BFD timer.

As further shown in FIG. 10, and by reference number 1015, the UE 120 may determine that no uplink resources are available in the second beam set for transmitting a BFR request for the first beam set. For example, the UE 120 may determine that there is no PUCCH scheduling request resource dedicated to per beam group BFR configured in the second beam group, there is no other PUCCH scheduling resource associated with the second beam group available, and there is no existing scheduled PUSCH resource associated with the second beam group available.

As further shown in FIG. 10, and by reference number 1020, in some aspects, the UE 120 may declare cell level beam failure for the cell based at least in part on the determination that no uplink resources are available in the second beam set for transmitting a BFR request for the first beam set. In this case, the UE 120 may select not to transmit a BFR request for the first beam group. For example, the UE 120 may select not to transmit a BFR request based at least in part on a determination that there is no PUCCH scheduling request resource dedicated to per beam group BFR configured in the second beam group, based at least in part on a determination that there is no other PUCCH scheduling resource associated with the second beam group available, and based at least in part on a determination that there is no existing scheduled PUSCH resource associated with the second beam group available. In this case, the UE 120 may declare cell level beam failure for the cell even if there is a still working TRP (e.g., the second TRP 705-2).

As further shown in FIG. 10, and by reference number 1025, in some aspects, the UE 120 may perform a RACH procedure to transmit the BFR request for the first beam group based at least in part on the determination that no uplink resources are available in the second beam set for transmitting a BFR request for the first beam set. In some aspects, the UE 120 may select to perform the RACH procedure, based at least in part on the determination that no uplink resources are available in the second beam set for transmitting a BFR request for the first beam set, instead of declaring cell-level beam failure.

In some aspects, the UE 120 may initiate a contention free RACH procedure using a RACH configured for the first beam group. For example, a first RACH preamble may be associated with the first beam group (e.g., the first TRP 705-1) and a second RACH preamble may be configured for the second beam group (e.g., the second TRP 705-2). In this case, the UE 120 may initiate the contention free RACH using a RACH resource associated with the first preamble (e.g., the RACH preamble associated with the failed TRP).

In some aspects, the UE 120 may initiate the contention free RACH procedure on selected candidate beam of the first beam group. For example, the selected candidate beam may be a candidate replacement beam for BFR for the first beam group. The select candidate beam may be selected by the UE 120 based on reference signals in a new beam information reference signal set configure for the first TRP (e.g., the first beam group). In some aspects, the UE 120 may initiate the contention free RACH procedure on a beam of the second beam group. For example, a failed TRP (e.g., the first TRP 705-1) may have a corresponding TRP (e.g., the second TRP 705-2) to transmit a RACH BFR request.

The UE 120, based at least in part on transmitting the RACH BFR request, may monitor a search space for a RACH response. For example, the UE 120 may monitor the search space for a PDCCH with CRC scrambled by C-RNTI or MCS-C-RNTI. In some aspects, the UE 120 may receive the RACH response (e.g., the PDCCH with CRC scrambled by C-RNTI or MCS-C-RNTI). In this case, the BFR response may be the RACH response to a RACH BFR request. In a case in which the RACH BFR request is transmitted using the selected candidate beam of the first beam group, the BFR response may indicate, to the UE 120, to use a selected beam candidate for communications with the first TRP 705-1. In a case in which the RACH BFR request is transmitted on a beam of the second beam group, the UE 120 may transmit a MAC-CE (e.g., the BFR MAC-CE) that includes an indication of the selected candidate beam in a subsequent message in the contention free RACH procedure. For example, the BFR response may include an uplink grant that schedules a PUSCH resource for the UE 120, and the UE 120 may transmit the BFR MAC-CE using the scheduled PUSCH resource.

In some aspects, the UE 120 may perform a contention based RACH procedure to transmit the BFR request based at least in part on a determination that the contention free RACH procedure is unsuccessful. For example, the UE 120 may perform the contention based RACH procedure based at least in part on the contention free RACH procedure failing more than a threshold number of times and/or for more than a threshold amount of time.

In some aspects, in a case in which the per beam group (e.g., per TRP) BFR is not successful after certain number of times or a certain amount of time, the UE 120 may proceed to a cell level BFR procedure or a radio link failure procedure. For example, the UE 120 may proceed to the cell level BFR procedure or the radio link failure procedure based at least in part on the contention based RACH procedure (performed after the contention free RACH procedure is unsuccessful) failing more than a threshold number of times and/or for more than a threshold amount of time.

In some aspects, based at least in part on detecting beam failure for a beam group (e.g., detecting beam failure for the first beam group associated with the first TRP 705-1), the UE 120 may perform one or more procedures (e.g., transmitting a BFR scheduling request and/or a BFR MAC-CE, the contention free RACH procedure, the contention based RACH procedure, a cell level BFR procedure, and/or a radio link failure procedure) in an escalating sequence of procedures. In this case, the procedures may be performed in a particular order, and when BFR fails or cannot be performed using one procedure, the UE 120 may proceed to the next procedure in the sequence. In some aspects, the order of the procedures in the sequence may be configured by a base station (e.g., gNB). In some aspects, the order of the procedures in the sequence may be preset, for example, in a wireless communication standard.

As indicated above, FIG. 10 is provided as an example. Other examples may differ from what is described with respect to FIG. 10.

Figure 11:
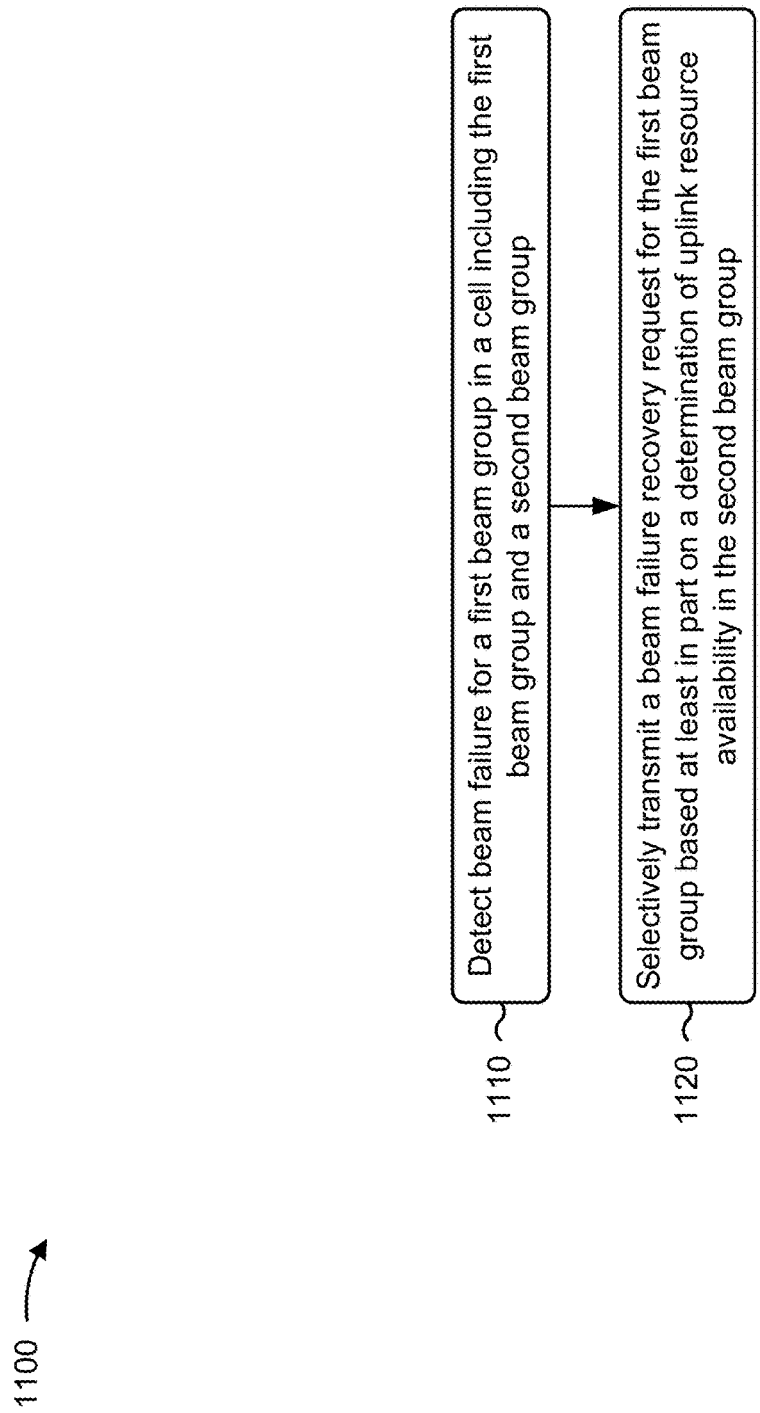
FIG. 11 is a diagram illustrating an example process associated with BFR requests for per beam group BFR, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with BFR requests for per beam group BFR.

As shown in FIG. 11, in some aspects, process 1100 may include detecting beam failure for a first beam group in a cell including the first beam group and a second beam group (block 1110). For example, the UE (e.g., using detection component 1208, depicted in FIG. 12) may detect beam failure for a first beam group in a cell including the first beam group and a second beam group, as described above.

As further shown in FIG. 11, in some aspects, process 1100 may include selectively transmitting a beam failure recovery request for the first beam group based at least in part on a determination of uplink resource availability in the second beam group (block 1120). For example, the UE (e.g., using transmission component 1204, depicted in FIG. 12) may selectively transmit a beam failure recovery request for the first beam group based at least in part on a determination of uplink resource availability in the second beam group, as described above.

Process 1100 may include additional aspects, such as any single aspect or any combination of aspects described below and/or in connection with one or more other processes described elsewhere herein.

In a first aspect, the first beam group is associated with a first transmit and receive point (TRP) in the cell and the second beam group is associated with a second TRP in the cell.

In a second aspect, alone or in combination with the first aspect, process 1100 includes measuring a first beam failure detection reference signal set associated with the first beam failure group and a second beam failure detection reference signal set associated with the second beam failure group, and detecting the beam failure for the first beam group is based at least in part on measuring the first beam failure detection reference signal set.

In a third aspect, alone or in combination with one or more of the first and second aspects, selectively transmitting the beam failure recovery request for the first beam group includes selecting to transmit the beam failure recovery request for first the first beam group based at least in part on a determination that at least one of a PUCCH scheduling request resource or a an existing scheduled PUSCH resource is available in the second beam group.

In a fourth aspect, alone or in combination with one or more of the first through third aspects, the beam failure recovery request includes a beam failure recovery scheduling request, and selectively transmitting the beam failure recovery request for the first beam group includes transmitting the beam failure recovery scheduling request on a beam of the second beam group using a PUCCH scheduling request resource dedicated to beam failure recovery for the first beam group.

In a fifth aspect, alone or in combination with one or more of the first through fourth aspects, process 1100 includes receiving, prior to detecting the beam failure, configuration information that maps the PUCCH scheduling request resource dedicated to beam failure recovery for the first beam group to the beam of the second beam group.

In a sixth aspect, alone or in combination with one or more of the first through fifth aspects, the configuration information maps a PUCCH scheduling request resource dedicated to beam failure recovery for the second beam group to a beam of the first beam group.

In a seventh aspect, alone or in combination with one or more of the first through sixth aspects, the beam failure recovery request includes a beam failure recovery scheduling request, and selectively transmitting the beam failure recovery request for the first beam group includes transmitting the beam failure recovery scheduling request using an earliest available physical uplink control channel (PUCCH) scheduling request resource on a beam of the second beam group based at least in part on a determination that one or more PUCCH scheduling request resources are available in the second beam group.

In an eighth aspect, alone or in combination with one or more of the first through seventh aspects, the earliest available PUCCH scheduling request resource is configured with a first spatial relationship associated with the beam of the second beam group and a second spatial relationship associated with a beam of the first beam group, and transmitting the beam failure recovery scheduling request includes transmitting the beam failure recovery scheduling request using the earliest available PUCCH scheduling request resource on the beam of the second beam group without transmitting the beam failure recovery request on the beam of the first beam group.

In a ninth aspect, alone or in combination with one or more of the first through seventh aspects, the earliest available PUCCH scheduling request resource is configured with a first spatial relationship associated with the beam of the second beam group and a second spatial relationship associated with a beam of the first beam group, and transmitting the beam failure recovery scheduling request includes transmitting the beam failure recovery scheduling request using the earliest available PUCCH scheduling request resource on the beam of the second beam group and on the beam of the first beam group.

In a tenth aspect, alone or in combination with one or more of the first through third aspects, the beam failure recovery request includes a beam failure recovery MAC-CE, and selectively transmitting the beam failure recovery request for the first beam group includes transmitting the beam failure recovery MAC-CE using an existing scheduled PUSCH resource on a beam of the second beam group, without transmitting a beam failure recovery scheduling request, based at least in part on a determination that the existing scheduled PUSCH resource is available and based at least in part on a determination that a size of the existing scheduled PUSCH resource is large enough to transmit the beam failure recovery MAC-CE.

In an eleventh aspect, alone or in combination with the tenth aspect, transmitting the beam failure recovery MAC-CE using the existing scheduled PUSCH resource on the beam of the second beam group is further based at least in part on a component carrier associated with the existing scheduled PUSCH resource.

In a twelfth aspect, alone or in combination with one or more of the first through eleventh aspects, selectively transmitting the beam failure recovery request for the first beam group includes transmitting, based at least in part on a determination that there is no PUCCH scheduling request resource dedicated to beam group beam failure recovery configured in the second beam group, one of a beam failure recovery scheduling request using a non-dedicated PUCCH scheduling request resource associated with the second beam group, based at least in part on a determination that the non-dedicated PUCCH scheduling request is available, or a beam failure recovery MAC-CE using an existing scheduled PUSCH resource associated with the second beam group, based at least in part on a determination that the existing scheduled PUSCH resource is available.

In a thirteenth aspect, alone or in combination with one or more of the first through third aspects, selectively transmitting the beam failure recovery request for the first beam group includes selecting not to transmit the beam failure recovery request for the first beam group based at least in part on a determination that there is no PUCCH scheduling request resource dedicated to beam group beam failure recovery configured in the second beam group, based at least in part on a determination that there is no other PUCCH scheduling resource associated with the second beam group available, and based at least in part on a determination that there is no existing scheduled PUSCH resource associated with the second beam group available, and process 1100 further includes declaring cell level beam failure for the cell based at least in part on selecting not to transmit the beam failure recovery request for the first beam group.

In a fourteenth aspect, alone or in combination with one or more of the first through third aspects, selectively transmitting the beam failure recovery request for the first beam group includes selecting to perform a RACH procedure to transmit the beam failure recovery request for the first beam group, based at least in part on a determination that there are no available uplink resources in the second beam group for transmitting the beam failure recovery request for the first beam group.

In a fifteenth aspect, alone or in combination with the fourteenth aspect, a first RACH preamble is associated with the first beam group and a second RACH preamble is associated with the second beam group, and performing the RACH procedure to transmit the beam failure recovery request for the first beam group includes initiating a contention free RACH procedure using a RACH resource associated with the first RACH preamble.

In a sixteenth aspect, alone or in combination the fifteenth aspect, initiating the contention free RACH procedure includes initiating the contention free RACH procedure on a beam of the first beam group, and the beam of the first beam group is a candidate replacement beam for beam failure recovery for the first beam group.

In a seventeenth aspect, alone or in combination with the fifteenth aspect, initiating the contention free RACH procedure includes initiating the contention free RACH procedure on a beam of the second beam group.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
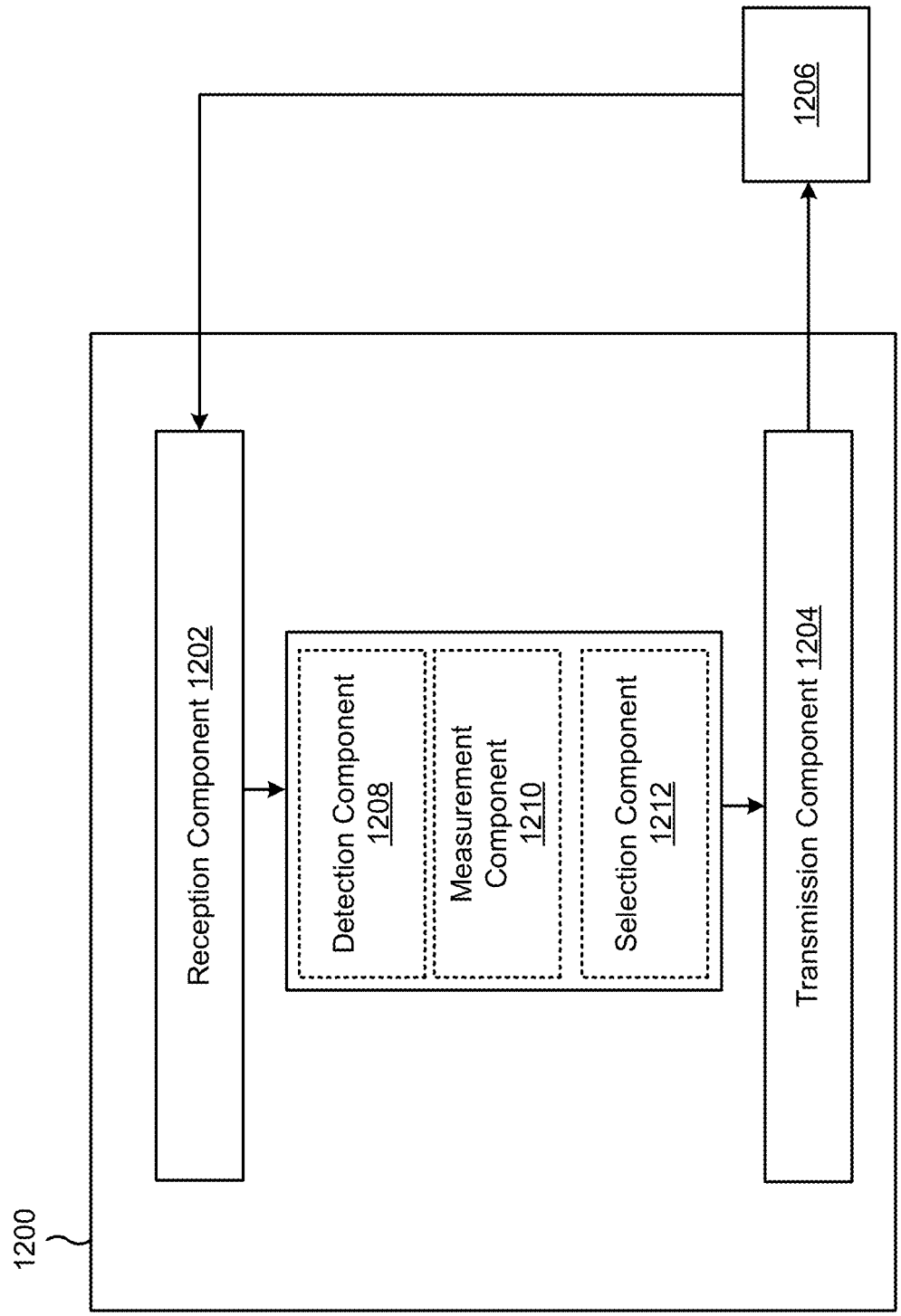
FIG. 12 is a block diagram of an example apparatus for wireless communication, in accordance with the present disclosure.

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a detection component 1208, a measurement component 1210, or a selection component 1210, among other examples.

In some aspects, the apparatus 1200 may be configured to perform one or more operations described herein in connection with FIGS. 7-10. Additionally, or alternatively, the apparatus 1200 may be configured to perform one or more processes described herein, such as process 1100 of FIG. 11, or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The detection component 1208 may detect beam failure for a first beam group in a cell including the first beam group and a second beam group. The selection component 1212 and/or the transmission component 1204 may selectively transmit a beam failure recovery request for the first beam group based at least in part on a determination of uplink resource availability in the second beam group.

The measurement component 1210 may measure a first beam failure detection reference signal set associated with the first beam failure group and a second beam failure detection reference signal set associated with the second beam failure group, wherein detecting the beam failure for the first beam group is based at least in part on measuring the first beam failure detection reference signal set.

The selection component 1212 may select to transmit the beam failure recovery request for first the first beam group based at least in part on a determination that at least one of a PUCCH scheduling request resource or a an existing scheduled PUSCH resource is available in the second beam group.

The reception component 1202 may receive, prior to detecting the beam failure, configuration information that maps a PUCCH scheduling request resource dedicated to beam failure recovery for the first beam group to a beam of the second beam group.

The selection component 1212 may select not to transmit the beam failure recovery request for the first beam group based at least in part on a determination that there is no PUCCH scheduling request resource dedicated to beam group beam failure recovery configured in the second beam group, based at least in part on a determination that there is no other PUCCH scheduling resource associated with the second beam group available, and based at least in part on a determination that there is no existing scheduled PUSCH resource associated with the second beam group available.

The selection component 1212 may select to perform a RACH procedure to transmit the beam failure recovery request for the first beam group, based at least in part on a determination that there are no available uplink resources in the second beam group for transmitting the beam failure recovery request for the first beam group.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: detecting beam failure for a first beam group in a cell including the first beam group and a second beam group; and selectively transmitting a beam failure recovery request for the first beam group based at least in part on a determination of uplink resource availability in the second beam group.

Aspect 2: The method of Aspect 1, wherein the first beam group is associated with a first transmit and receive point (TRP) in the cell and the second beam group is associated with a second TRP in the cell.

Aspect 3: The method of any of Aspects 1-2, further comprising: measuring a first beam failure detection reference signal set associated with the first beam failure group and a second beam failure detection reference signal set associated with the second beam failure group, wherein detecting the beam failure for the first beam group is based at least in part on measuring the first beam failure detection reference signal set.

Aspect 4: The method of any of Aspects 1-3, wherein the beam failure recovery request includes a beam failure recovery scheduling request, and selectively transmitting the beam failure recovery request for the first beam group comprises: selecting to transmit the beam failure recovery request for first the first beam group based at least in part on a determination that at least one of a physical uplink control channel (PUCCH) scheduling request resource or a an existing scheduled physical uplink shared channel (PUSCH) resource is available in the second beam group.

Aspect 5: The method of any of Aspects 1-4, wherein the beam failure recovery request includes a beam failure recovery scheduling request, and selectively transmitting the beam failure recovery request for the first beam group comprises: transmitting the beam failure recovery scheduling request on a beam of the second beam group using a physical uplink control channel (PUCCH) scheduling request resource dedicated to beam failure recovery for the first beam group.

Aspect 6: The method of Aspect 5, further comprising: receiving, prior to detecting the beam failure, configuration information that maps the PUCCH scheduling request resource dedicated to beam failure recovery for the first beam group to the beam of the second beam group.

Aspect 7: The method of Aspect 6, wherein the configuration information maps a PUCCH scheduling request resource dedicated to beam failure recovery for the second beam group to a beam of the first beam group.

Aspect 8: The method of any of Aspects 1-4, wherein the beam failure recovery request includes a beam failure recovery scheduling request, and selectively transmitting the beam failure recovery request for the first beam group comprises: transmitting the beam failure recovery scheduling request using an earliest available physical uplink control channel (PUCCH) scheduling request resource on a beam of the second beam group based at least in part on a determination that one or more PUCCH scheduling request resources are available in the second beam group.

Aspect 9: The method of Aspect 8, wherein the earliest available PUCCH scheduling request resource is configured with a first spatial relationship associated with the beam of the second beam group and a second spatial relationship associated with a beam of the first beam group, and transmitting the beam failure recovery scheduling request comprises: transmitting the beam failure recovery scheduling request using the earliest available PUCCH scheduling request resource on the beam of the second beam group without transmitting the beam failure recovery request on the beam of the first beam group.

Aspect 10: The method of Aspect 8, wherein the earliest available PUCCH scheduling request resource is configured with a first spatial relationship associated with the beam of the second beam group and a second spatial relationship associated with a beam of the first beam group, and transmitting the beam failure recovery scheduling request comprises: transmitting the beam failure recovery scheduling request using the earliest available PUCCH scheduling request resource on the beam of the second beam group and on the beam of the first beam group.

Aspect 11: The method of any of Aspects 1-4, wherein the beam failure recovery request includes a beam failure recovery medium access control (MAC) control element (MAC-CE), and selectively transmitting the beam failure recovery request for the first beam group comprises: transmitting the beam failure recovery MAC-CE using an existing scheduled physical uplink shared channel (PUSCH) resource on a beam of the second beam group, without transmitting a beam failure recovery scheduling request, based at least in part on a determination that the existing scheduled PUSCH resource is available and based at least in part on a determination that a size of the existing scheduled PUSCH resource is large enough to transmit the beam failure recovery MAC-CE.

Aspect 12: The method of Aspect 11, wherein transmitting the beam failure recovery MAC-CE using the existing scheduled PUSCH resource on the beam of the second beam group is further based at least in part on a component carrier associated with the existing scheduled PUSCH resource.

Aspect 13: The method of any of Aspects 1-4 or 8-12, wherein selectively transmitting the beam failure recovery request for the first beam group comprises: transmitting, based at least in part on a determination that there is no physical uplink control channel (PUCCH) scheduling request resource dedicated to beam group beam failure recovery configured in the second beam group, one of: a beam failure recovery scheduling request using a non-dedicated PUCCH scheduling request resource associated with the second beam group, based at least in part on a determination that the non-dedicated PUCCH scheduling request is available, or a beam failure recovery medium access control (MAC) control element (MAC-CE) using an existing scheduled physical uplink shared channel (PUSCH) resource associated with the second beam group, based at least in part on a determination that the existing scheduled PUSCH resource is available.

Aspect 14: The method of any of Aspects 1-3, wherein selectively transmitting the beam failure recovery request for the first beam group comprises: selecting not to transmit the beam failure recovery request for the first beam group based at least in part on a determination that there is no physical uplink control channel (PUCCH) scheduling request resource dedicated to beam group beam failure recovery configured in the second beam group, based at least in part on a determination that there is no other PUCCH scheduling resource associated with the second beam group available, and based at least in part on a determination that there is no existing scheduled physical uplink shared channel (PUSCH) resource associated with the second beam group available; and wherein the method further comprises: declaring cell level beam failure for the cell based at least in part on selecting not to transmit the beam failure recovery request for the first beam group.

Aspect 15: The method of any of Aspects 1-3, wherein selectively transmitting the beam failure recovery request for the first beam group comprises: selecting to perform a random access channel (RACH) procedure to transmit the beam failure recovery request for the first beam group, based at least in part on a determination that there are no available uplink resources in the second beam group for transmitting the beam failure recovery request for the first beam group.

Aspect 16: The method of Aspect 15, wherein a first RACH preamble is associated with the first beam group and a second RACH preamble is associated with the second beam group, and selecting to perform the RACH procedure to transmit the beam failure recovery request for the first beam group comprises: initiating a contention free RACH procedure using a RACH resource associated with the first RACH preamble.

Aspect 17: The method of Aspect 16, wherein initiating the contention free RACH procedure comprises: initiating the contention free RACH procedure on a beam of the first beam group, wherein the beam of the first beam group is a candidate replacement beam for beam failure recovery for the first beam group.

Aspect 18: The method of Aspect 16, wherein initiating the contention free RACH procedure comprises: initiating the contention free RACH procedure on a beam of the second beam group.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the memory and the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, which, individually or in any combination, are operable to cause the apparatus to:
receive configuration information that configures one or more scheduling request resources for per beam group beam failure recovery scheduling requests;
detect beam failure for a first beam group in a cell including the first beam group and a second beam group; and
transmit, using a physical uplink control channel (PUCCH) scheduling request resource for beam failure recovery for the first beam group, a beam failure recovery scheduling request for the first beam group based at least in part on the configuration information and a determination of uplink resource availability in the second beam group.

2. The apparatus of claim 1, wherein the one or more processors, to transmit the beam failure recovery scheduling request for the first beam group, are operable to cause the apparatus to:
transmit the beam failure recovery scheduling request for the first beam group on a beam of the second beam group.

3. The apparatus of claim 1, wherein the configuration information maps the PUCCH scheduling request resource for beam failure recovery for the first beam group to a beam of the second beam group.

4. The apparatus of claim 3, wherein the configuration information maps a PUCCH scheduling request resource for beam failure recovery for the second beam group to a beam of the first beam group.

5. The apparatus of claim 1, wherein the first beam group is associated with a first transmit and receive point (TRP) in the cell and the second beam group is associated with a second TRP in the cell.

6. The apparatus of claim 1, wherein the one or more processors are further operable to cause the apparatus to:
measure a first beam failure detection reference signal set associated with the first beam group and a second beam failure detection reference signal set associated with the second beam group, wherein detection of the beam failure for the first beam group is based at least in part on measurement of the first beam failure detection reference signal set.

7. The apparatus of claim 1, wherein the one or more processors, to transmit the beam failure recovery scheduling request for the first beam group, are operable to cause the apparatus to:
transmit the beam failure recovery scheduling request for the first beam group based at least in part on a determination that at least one of a PUCCH scheduling request resource or an existing scheduled physical uplink shared channel (PUSCH) resource is available in the second beam group.

8. The apparatus of claim 1, wherein the one or more processors, to transmit the beam failure recovery scheduling request for the first beam group, are operable to cause the apparatus to:
transmit the beam failure recovery scheduling request using an earliest available PUCCH scheduling request resource on a beam of the second beam group based at least in part on a determination that one or more PUCCH scheduling request resources are available in the second beam group.

9. The apparatus of claim 8, wherein the earliest available PUCCH scheduling request resource is configured with a first spatial relationship associated with the beam of the second beam group and a second spatial relationship associated with a beam of the first beam group, and wherein the one or more processors, to transmit the beam failure recovery scheduling request, are operable to cause the apparatus to:
transmit the beam failure recovery scheduling request using the earliest available PUCCH scheduling request resource on the beam of the second beam group without transmitting the beam failure recovery scheduling request on the beam of the first beam group.

10. The apparatus of claim 8, wherein the earliest available PUCCH scheduling request resource is configured with a first spatial relationship associated with the beam of the second beam group and a second spatial relationship associated with a beam of the first beam group, and wherein the one or more processors, to transmit the beam failure recovery scheduling request, are operable to cause the apparatus to:
transmit the beam failure recovery scheduling request using the earliest available PUCCH scheduling request resource on the beam of the second beam group and on the beam of the first beam group.

11. A method of wireless communication performed by a user equipment (UE), comprising:
receiving configuration information that configures one or more scheduling request resources for per beam group beam failure recovery scheduling requests;
detecting beam failure for a first beam group in a cell including the first beam group and a second beam group; and
transmitting, using a physical uplink control channel (PUCCH) scheduling request resource for beam failure recovery for the first beam group, a beam failure recovery scheduling request for the first beam group based at least in part on the configuration information and a determination of uplink resource availability in the second beam group.

12. The method of claim 11, wherein transmitting the beam failure recovery scheduling request for the first beam group comprises:
transmitting the beam failure recovery scheduling request for the first beam group on a beam of the second beam group.

13. The method of claim 11, wherein the configuration information maps the PUCCH scheduling request resource for beam failure recovery for the first beam group to a beam of the second beam group.

14. The method of claim 13, wherein the configuration information maps a PUCCH scheduling request resource for beam failure recovery for the second beam group to a beam of the first beam group.

15. The method of claim 11, wherein the first beam group is associated with a first transmit and receive point (TRP) in the cell and the second beam group is associated with a second TRP in the cell.

16. The method of claim 11, further comprising:
measuring a first beam failure detection reference signal set associated with the first beam group and a second beam failure detection reference signal set associated with the second beam group, wherein detecting the beam failure for the first beam group is based at least in part on measuring the first beam failure detection reference signal set.

17. The method of claim 11, wherein transmitting the beam failure recovery scheduling request for the first beam group comprises:
    transmitting the beam failure recovery scheduling request for the first beam group based at least in part on a determination that at least one of a PUCCH scheduling request resource or an existing scheduled physical uplink shared channel (PUSCH) resource is available in the second beam group.

18. The method of claim 11, wherein transmitting the beam failure recovery scheduling request for the first beam group comprises:
    transmitting the beam failure recovery scheduling request using an earliest available PUCCH scheduling request resource on a beam of the second beam group based at least in part on a determination that one or more PUCCH scheduling request resources are available in the second beam group.

19. The method of claim 18, wherein the earliest available PUCCH scheduling request resource is configured with a first spatial relationship associated with the beam of the second beam group and a second spatial relationship associated with a beam of the first beam group, and wherein transmitting the beam failure recovery scheduling request comprises:
    transmitting the beam failure recovery scheduling request using the earliest available PUCCH scheduling request resource on the beam of the second beam group; and
    selectively transmitting the beam failure recovery scheduling request on the beam of the first beam group.

20. A non-transitory computer-readable medium storing one or more instructions for wireless communication that, when executed by one or more processors of a user equipment (UE), cause the UE to:
    receive configuration information that configures one or more scheduling request resources for per beam group beam failure recovery scheduling requests;
    detect beam failure for a first beam group in a cell including the first beam group and a second beam group; and
    transmit a beam failure recovery scheduling request for the first beam group based at least in part on the configuration information and a determination of uplink resource availability in the second beam group, wherein the beam failure recovery scheduling request is transmitted on a beam of the second beam group using a physical uplink control channel (PUCCH) scheduling request resource for beam failure recovery for the first beam group.

* * * * *